United States Patent
Inoue

(10) Patent No.: US 10,480,672 B2
(45) Date of Patent: Nov. 19, 2019

(54) FLOW RATE ADJUSTING DEVICE

(71) Applicant: Surpass Industry Co., Ltd., Gyoda-shi, Saitama (JP)

(72) Inventor: Atsushi Inoue, Saitama (JP)

(73) Assignee: SURPASS INDUSTRY CO., LTD. (JP)

( * ) Notice: Subject to any disclaimer, the term of this patent is extended or adjusted under 35 U.S.C. 154(b) by 229 days.

(21) Appl. No.: 15/638,673

(22) Filed: Jun. 30, 2017

(65) Prior Publication Data

US 2018/0010708 A1 Jan. 11, 2018

(30) Foreign Application Priority Data

Jul. 5, 2016 (JP) .................. 2016-133445

(51) Int. Cl.
*F16K 31/04* (2006.01)
*F16K 11/22* (2006.01)
(Continued)

(52) U.S. Cl.
CPC ............ *F16K 31/046* (2013.01); *F16K 11/22* (2013.01); *G01F 1/66* (2013.01); *G01F 15/002* (2013.01);
(Continued)

(58) Field of Classification Search
CPC ... G01F 1/74; G01F 1/708; G01F 5/00; G01F 1/66; G01F 15/02; G01F 15/002;
(Continued)

(56) References Cited

U.S. PATENT DOCUMENTS 6,622,096 B1 * 9/2003 Ouji ................. G01F 1/667
 702/45
6,644,129 B1 * 11/2003 Shiba .................. G01F 1/662
 73/861.27

(Continued)

FOREIGN PATENT DOCUMENTS

EP 2450675 A2 5/2012
GB 2497321 A 6/2013
(Continued)

OTHER PUBLICATIONS

Extended European Search Report dated Nov. 17, 2017 in EP Application No. 17179117.1, 9 pages.

*Primary Examiner* — Jessica Cahill
(74) *Attorney, Agent, or Firm* — MH2 Technology Law Group LLP

(57) ABSTRACT

Provided is a flow rate adjusting device including: an ultrasonic flow metering portion; a flow rate adjusting portion; a control portion configured to control the flow rate adjusting portion so that the flow rate of the fluid measured by the ultrasonic flow metering portion matches a set value; a pressure sensor configured to measure a pressure of the fluid flowing into an upstream side of a measurement flow channel from an inflow port; and a storage portion configured to store information that associates the flow rate of the fluid obtained from the propagation time difference measured by the ultrasonic flow metering portion, the set value of the target flow rate, and the pressure measured by the pressure sensor with each other when the control portion controls the flow rate adjusting portion.

8 Claims, 15 Drawing Sheets

(51) Int. Cl.
*G01F 1/66* (2006.01)
*G01F 15/00* (2006.01)
*G01F 15/02* (2006.01)
*G01F 15/06* (2006.01)
*G05D 7/06* (2006.01)
*F24F 110/40* (2018.01)

(52) U.S. Cl.
CPC ............ *G01F 15/005* (2013.01); *G01F 15/02* (2013.01); *G01F 15/06* (2013.01); *G05D 7/0635* (2013.01); *F24F 2110/40* (2018.01)

(58) Field of Classification Search
CPC ..... G01F 15/005; G01F 15/06; G05D 7/0635; F16K 31/046; F16K 11/22
See application file for complete search history.

(56) References Cited

U.S. PATENT DOCUMENTS

| | | | | |
|---|---|---|---|---|
| 10,119,850 B2* | 11/2018 | Mohr | ............ | G01F 1/708 |
| 10,119,929 B2* | 11/2018 | Mohr | ............ | E21B 49/08 |
| 2005/0005709 A1* | 1/2005 | Schaffer | ............ | G01F 1/667 |
| | | | | 73/861 |
| 2007/0220995 A1* | 9/2007 | Kishiro | ............ | G01F 1/662 |
| | | | | 73/861.28 |
| 2008/0059085 A1* | 3/2008 | Simon | ............ | G01F 1/66 |
| | | | | 702/48 |
| 2008/0294293 A1* | 11/2008 | Yamamoto | ............ | F16K 31/126 |
| | | | | 700/282 |
| 2009/0035121 A1* | 2/2009 | Watson | ............ | F01C 1/126 |
| | | | | 415/1 |
| 2011/0048556 A1* | 3/2011 | Carter | ............ | F16K 31/122 |
| | | | | 137/559 |
| 2012/0036042 A1* | 2/2012 | Graylin | ............ | G06Q 20/32 |
| | | | | 705/26.41 |
| 2012/0036942 A1 | 2/2012 | Hasunuma | | |
| 2012/0090702 A1 | 4/2012 | Shalev | | |
| 2013/0146148 A1 | 6/2013 | Smirnov | | |
| 2014/0299204 A1* | 10/2014 | Somani | ............ | G01F 15/003 |
| | | | | 137/486 |
| 2014/0299210 A1 | 10/2014 | Atherton | | |
| 2014/0343736 A1* | 11/2014 | Meyer | ............ | G01M 3/18 |
| | | | | 700/283 |
| 2015/0277447 A1 | 10/2015 | Schmidt | | |
| 2017/0153132 A1 | 6/2017 | Aughton | | |

FOREIGN PATENT DOCUMENTS

| | | |
|---|---|---|
| JP | 2008-232990 A | 10/2008 |
| JP | 2012-42243 A | 3/2012 |
| WO | 99/51943 A1 | 10/1999 |
| WO | 2016/004471 A1 | 1/2016 |

* cited by examiner

FLOW RATE ADJUSTING DEVICE

CROSS-REFERENCE TO RELATED APPLICATIONS

This application is based on Japanese Patent Application No. 2016-133445, the contents of which are incorporated herein by reference in its entirety.

TECHNICAL FIELD

The present disclosure relates to a flow rate adjusting device including an ultrasonic flow metering portion.

BACKGROUND ART

An ultrasonic flow meter including a straight tube-shaped tubular body for measurement through which a fluid for measuring a flow rate flows has been conventionally known (for example, see Japanese Unexamined Patent Application, Publication No. 2012-42243 (hereinafter referred to as "JP 2012-42243")). The ultrasonic flow meter disclosed in JP 2012-42243 has a structure in which a pair of ultrasonic wave oscillators is disposed at a predetermined interval on the outer periphery of the straight tube-shaped tubular body for measurement. The ultrasonic flow meter disclosed in JP 2012-42243 is used exclusively for measuring a flow rate, and does not have a function of adjusting the flow rate of a fluid.

When the function of adjusting the flow rate is added to the ultrasonic flow meter disclosed in JP 2012-42243, the portion of the straight tube-shaped tubular body for measurement corresponds to a portion where ultrasonic waves transmitted from the pair of ultrasonic wave oscillators are propagated. In this portion, the flow rate adjustment cannot be performed. Accordingly, when the function of adjusting the flow rate is added to the ultrasonic flow meter disclosed in JP 2012-42243, it is necessary to connect an additional flow rate adjusting device to the downstream side of the ultrasonic flow meter.

SUMMARY

Technical Problem

When the additional flow rate adjusting device is connected to the downstream side of the ultrasonic flow meter disclosed in JP 2012-42243, the flow rate of a fluid can be adjusted based on the flow rate measured by the ultrasonic flow meter.

However, the ultrasonic flow meter is a device for measuring the flow rate not based on the pressure of the fluid, unlike a differential pressure type flow meter or the like. Accordingly, if an abnormality occurs due to the pressure of the fluid, it is impossible to determine whether the abnormality is an abnormality due to the pressure of the fluid or an abnormality in the ultrasonic flow meter itself.

For example, when an on-off valve is maintained in a closed state and the fluid does not flow into the ultrasonic flow meter, the fluid is not introduced into the ultrasonic flow meter and is maintained in an atmospheric pressure state. Accordingly, in this case, the abnormality is caused due to the pressure of the fluid. When the flow rate of the fluid measured by the ultrasonic flow meter is zero and thus it is unclear whether the abnormality is caused due to the pressure of the fluid, there is a possibility that the abnormality may be determined to be an abnormality in the ultrasonic flow meter itself.

The present disclosure has been made in view of the above-mentioned circumstances, and an object of the present disclosure is to provide a flow rate adjusting device capable of adjusting a flow rate based on the measurement of the flow rate by an ultrasonic flow metering portion including a straight tube-shaped measurement flow channel and the measurement result, and capable of discriminating an abnormality due to the pressure of a fluid.

Solution to Problem

To solve the above-mentioned problems, the present disclosure employs the following solutions.

A flow rate adjusting device according to one aspect of the present disclosure includes: an ultrasonic flow metering portion configured to measure a propagation time difference between ultrasonic waves transmitted by a pair of oscillators disposed at an upstream side and a downstream side of a straight tube-shaped measurement flow channel to obtain a flow rate of a fluid, the fluid flowing from an inflow port and being circulated through the measurement flow channel; a flow rate adjusting portion configured to adjust the flow rate of the fluid flowing out to an outflow port from the downstream side of the measurement flow channel; a control portion configured to control the flow rate adjusting portion in such a manner that the flow rate of the fluid measured by the ultrasonic flow metering portion matches a set value preliminarily set; a pressure measuring portion configured to measure a pressure of the fluid flowing into the upstream side of the measurement flow channel from the inflow port; and a storage portion configured to store information that associates the flow rate of the fluid obtained from the propagation time difference measured by the ultrasonic flow metering portion, the set value, and the pressure measured by the pressure measuring portion with each other when the control portion controls the flow rate adjusting portion.

In the flow rate adjusting device according to one aspect of the present disclosure, when the propagation time difference between ultrasonic waves transmitted by the pair of ultrasonic wave oscillators is measured by the ultrasonic flow metering portion to obtain the flow rate of the fluid circulated in the straight tube-shaped measurement flow channel, the pressure of the fluid flowing into the upstream side of the measurement flow channel is measured by the pressure measuring portion. The pressure measured by the pressure measuring portion is stored in the storage portion as information associated with the flow rate of the fluid obtained from the propagation time difference measured by the ultrasonic flow metering portion and the set value preliminarily set, when the control portion controls the flow rate adjusting portion.

If such an abnormality that the flow rate of the fluid obtained from the propagation time difference measured by the ultrasonic flow metering portion does not change even when the set value is set occurs in the flow rate adjusting device, it can be determined whether the abnormality is an abnormality due to the pressure of the fluid, or an abnormality in the flow rate adjusting device itself, by referring to the information stored in the storage portion.

For example, when the fluid does not flow into the inflow port and the flow rate of the fluid obtained from the propagation time difference is zero, it can be recognized, based on the information stored in the storage portion, that the fluid is not guided to the measurement flow channel and is maintained in the atmospheric pressure state. In this case, it can be determined that the cause of the abnormality that the flow rate of the fluid obtained from the propagation time difference measured by the ultrasonic flow metering portion is zero is due to the pressure of the fluid maintained in the atmospheric pressure state without being guided to the measurement flow channel.

Thus, according to the flow rate adjusting device of one aspect of the present disclosure, it is possible to provide a flow rate adjusting device capable of adjusting a flow rate based on the measurement of the flow rate by the ultrasonic flow metering portion including the straight tube-shaped measurement flow channel and the measurement result, and capable of discriminating an abnormality due to the pressure of a fluid.

The flow rate adjusting device according to one aspect of the present disclosure may have a structure in which: the flow rate adjusting portion includes: a valve body portion inserted into a valve hole formed in an outflow-side flow channel portion configured to guide the fluid to the outflow port; and a drive portion configured to cause the valve body portion to advance or recede along a central axis of the valve hole; and when the control portion controls the flow rate adjusting portion, the storage portion stores, in a manner associated with each other, the pressure measured by the pressure measuring portion and an opening degree of the valve body portion obtained from a position of the valve body portion caused to advance or recede by the drive portion.

With this structure, for example, if such an abnormality that the flow rate of the fluid obtained from the propagation time difference measured by the ultrasonic flow metering portion does not change, even when the set value is set, while the opening degree of the valve body portion increases, occurs in the flow rate adjusting device, it can be determined whether the abnormality is an abnormality due to the pressure of the fluid, or an abnormality in the flow rate adjusting device itself, by referring to the information stored in the storage portion.

The flow rate adjusting device according to one aspect of the present disclosure may have a structure in which when the control portion controls the flow rate adjusting portion, the control portion determines whether or not the pressure measured by the pressure measuring portion is in a predetermined abnormal state, and notifies the predetermined abnormal state when it is determined that the pressure is in the predetermined abnormal state.

With this structure, an operator who operates the flow rate adjusting device can easily recognize whether or not the pressure measured by the pressure measuring portion is in the predetermined abnormal state.

In the flow rate adjusting device having a structure as described above, the predetermined abnormal state may be one of a state where the pressure measured by the pressure measuring portion is maintained at a first predetermined pressure or lower, a state where the pressure measured by the pressure measuring portion is maintained at a second predetermined pressure or higher, and a state where a variation per unit time of the pressure measured by the pressure measuring portion exceeds a predetermined amount.

With this structure, one of the following states, i.e., a state where the pressure of the fluid flowing into the measurement flow channel is equal to or lower than the first predetermined pressure and the amount of the fluid to be supplied is small, a state where the pressure is equal to or higher than the second predetermined pressure and the fluid flow rate adjustment cannot be appropriately performed, and a state where no fluid is supplied, and be determined to be the predetermined abnormal state.

The flow rate adjusting device according to one aspect of the present disclosure may further include a communication portion to be connected to an external device via a communication line, and may have a structure in which when the communication portion receives a transmission request for transmitting the information from the external device, the control portion controls the communication portion to transmit the information stored in the storage portion to the external device.

With this structure, it can be determined whether the occurring abnormality is an abnormality due to the pressure of the fluid, or an abnormality in the flow rate adjusting device itself, by transmitting the information stored in the storage portion in response to the transmission request from the external device and referring to the information by the external device.

The flow rate adjusting device having a structure as described above may have a structure in which when the communication portion receives a deletion instruction from the external device after transmitting the information to the external device, the control portion controls the storage portion to delete the transmitted information stored in the storage portion.

With this structure, an area necessary for storing the information can be appropriately secured by deleting the information stored in the storage portion after completion of the transmission of the information to the external device, while the information in the storage portion can be reliably stored until the transmission of the information to the external device is completed. Further, the deletion of the information stored in the storage portion prevents leakage of important classified information such as the control content of the control portion.

Advantageous Effects

According to the present disclosure, it is possible to provide a flow rate adjusting device capable of adjusting a flow rate based on a result of measurement of the flow rate by an ultrasonic flow metering portion including a straight tube-shaped measurement flow channel and capable of discriminating an abnormality due to the pressure of a fluid.

A flow rate adjusting device 100 according to an embodiment of the present disclosure will be described with reference to the drawings.

Figure 1:
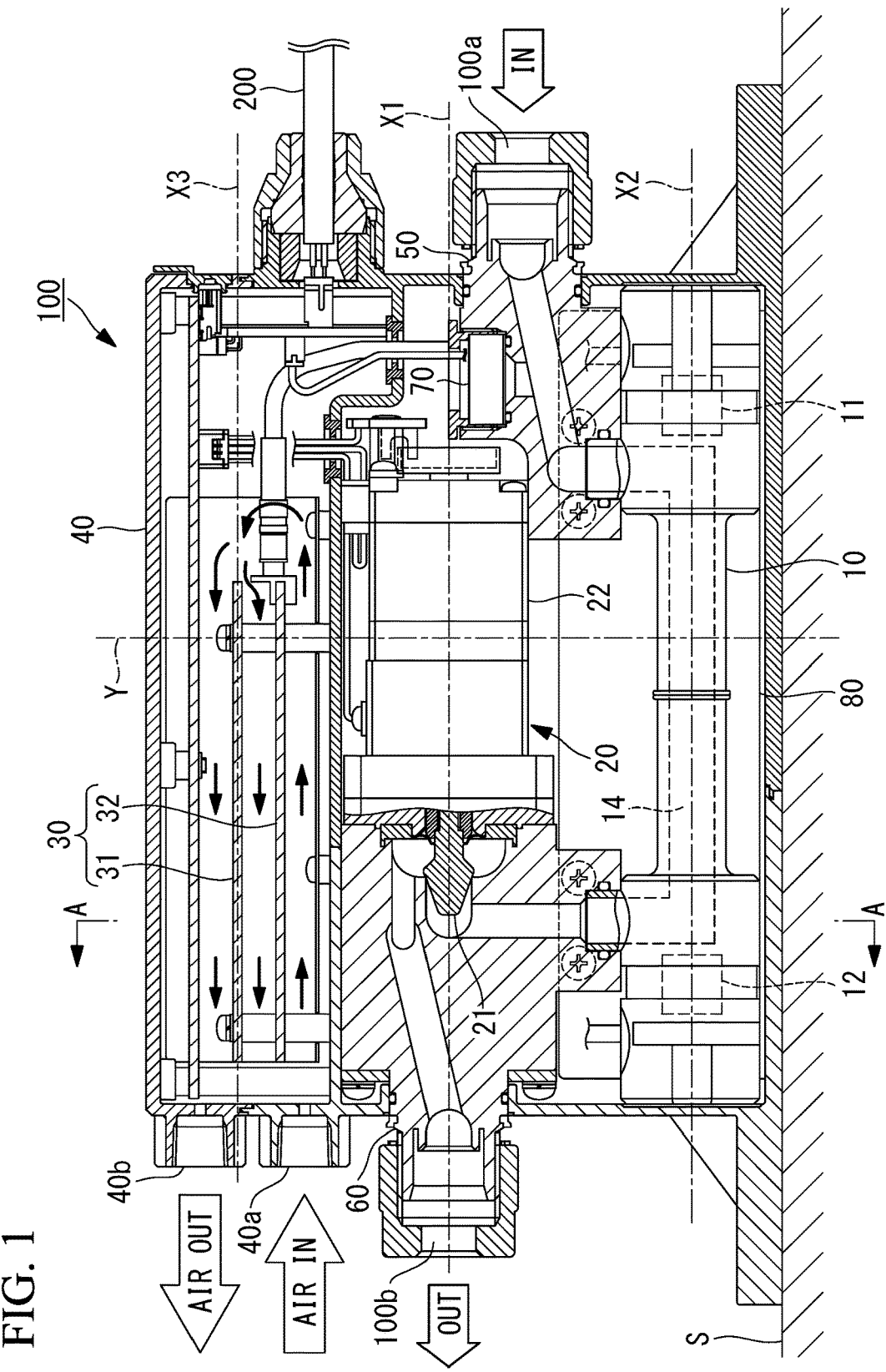
FIG. 1 is a partial longitudinal sectional view showing an embodiment of a flow rate adjusting device.
Figure 2:
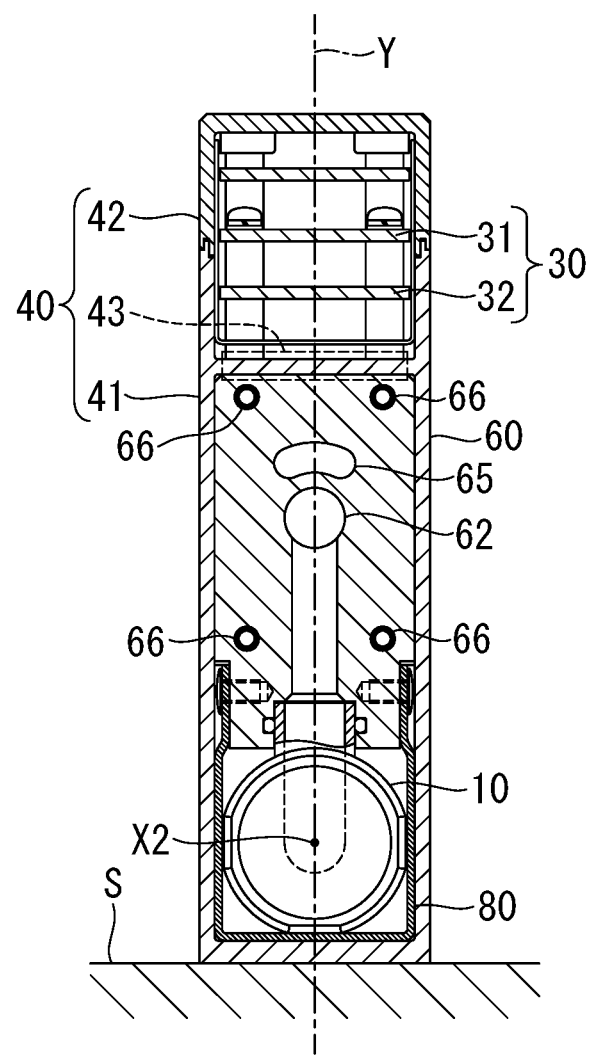
FIG. 2 is a partial sectional view taken along an arrow line A-A of the flow rate adjusting device shown in FIG. 1.

The flow rate adjusting device 100 of this embodiment shown in FIGS. 1 and 2 includes: an ultrasonic flow metering portion 10 which measures a flow rate of a fluid circulated through a straight tube-shaped measurement flow channel 14; a flow rate adjusting portion 20 which adjusts the flow rate of the fluid; a control portion 30 which controls the flow rate adjusting portion 20; a housing portion 40 which accommodates the ultrasonic flow metering portion 10, the flow rate adjusting portion 20, the control portion 30; an inflow-side flow channel portion 50 which guides the fluid flowing in from an inflow port 100a to an upstream side of the measurement flow channel 14; an outflow-side flow channel portion 60 which guides the fluid flowing out from a downstream side of the measurement flow channel 14 to an outflow port 100b; a pressure sensor (pressure measuring portion) 70; and a shield member 80.

The fluid whose flow rate is adjusted by the flow rate adjusting device 100 of this embodiment is, for example, a liquid such as a drug solution or pure water used for semiconductor manufacturing devices. The temperature of the fluid is, for example, a temperature in an ordinary temperature range (for example, 10° C. or higher and lower than 50° C.) or a high-temperature range (for example, 50° C. or higher and 80° C. or lower).

The housing portion 40 of the flow rate adjusting device 100 is fixed to an installation surface S with fastening bolts (not shown). The flow rate adjusting device 100 is connected to an external device (not shown) via a cable 200, is supplied with power from the external device via the cable 200, and transmits various signals to the external device and receives various signals therefrom. Examples of the signals received from the external device include a signal indicating a set value of a target flow rate adjusted by the flow rate adjusting device 100. Examples of the signals transmitted to the external device include a signal indicating the flow rate of the fluid calculated by the control portion 30 on the basis of s signal measured by the ultrasonic flow metering portion 10, and a signal indicating the pressure of the fluid measured by the pressure sensor 70.

The ultrasonic flow metering portion 10 measures a propagation time difference between ultrasonic waves transmitted by a pair of oscillators, i.e., an upstream side oscillator 11 disposed at the upstream side of the measurement flow channel 14 and a downstream side oscillator 12 disposed at the downstream side of the measurement flow channel 14, so as to obtain the flow rate of the fluid which flows in from an inflow-side pipe (not shown) and is circulated through the straight tube-shaped measurement flow channel 14.

Figure 3:
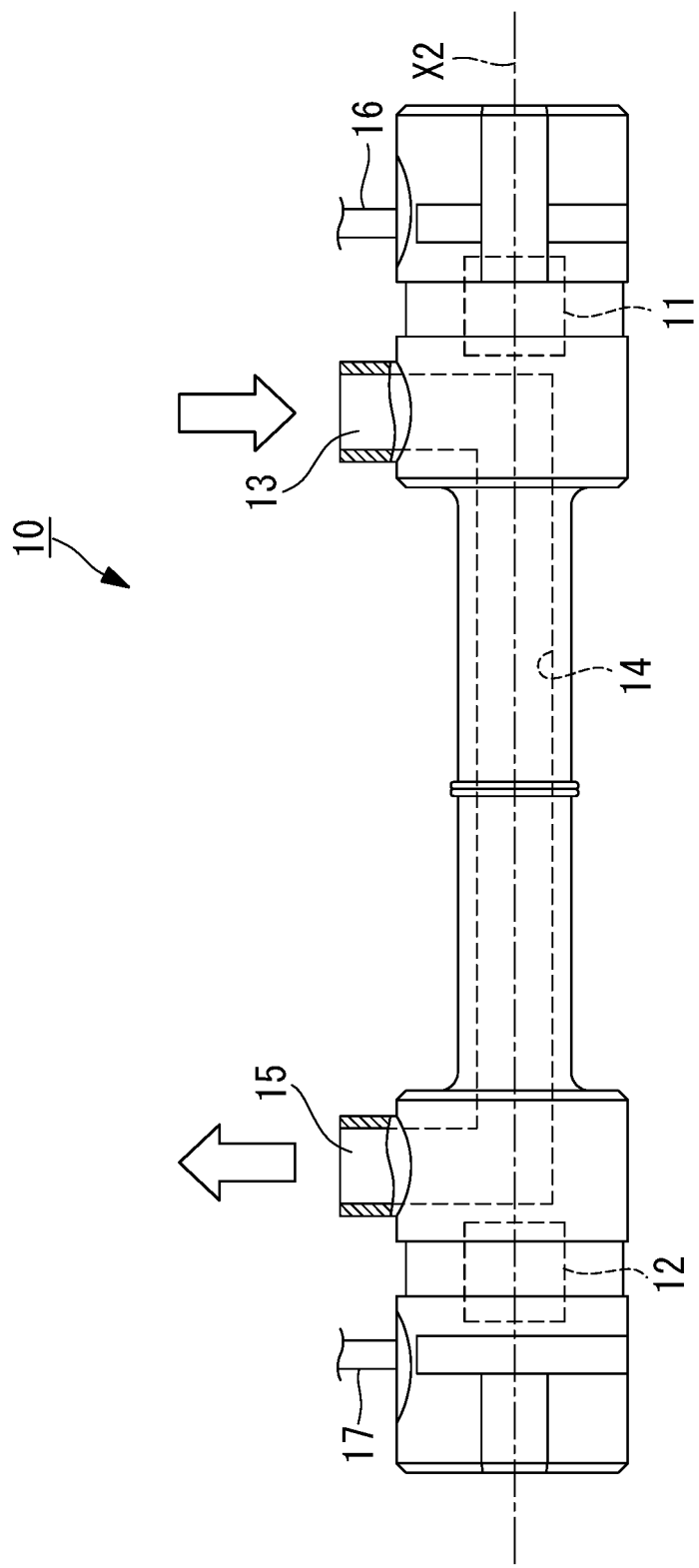
FIG. 3 is a partial longitudinal sectional view showing an ultrasonic flow metering portion shown in FIG. 1.

As shown in FIG. 3, the ultrasonic flow metering portion 10 includes: the upstream side oscillator 11 and the downstream side oscillator 12 which are disposed on an axis line X2 that is parallel to the installation surface S; an inflow channel 13 which is connected to the inflow-side flow channel portion 50; the straight tube-shaped measurement flow channel 14 which is connected to the inflow channel 13 and extends along the axis line X2 (second axis line); and an outflow channel 15 which is connected to the outflow-side flow channel portion 60. The axis line X2 is parallel to an axis line X1 (first axis line) in which a valve body portion 21, which is described later, advances or recedes.

The upstream side oscillator 11 and the downstream side oscillator 12 are disposed at positions opposed to each other across the measurement flow channel 14 on the axis line X2, and can transmit and receive ultrasonic wave signals. The ultrasonic wave signal transmitted from the upstream side oscillator 11 propagates through the fluid circulated through the measurement flow channel 14 and is received by the downstream side oscillator 12. Similarly, the ultrasonic wave signal transmitted from the downstream side oscillator 12 propagates through the fluid circulated through the measurement flow channel 14 and is received by the upstream side oscillator 11. Since the fluid is circulated through the measurement flow channel 14 from the upstream side to the downstream side, a propagation time for the ultrasonic wave signal transmitted from the upstream side oscillator 11 to the downstream side oscillator 12 is shorter than a propagation time for the ultrasonic wave signal transmitted from the downstream side oscillator 12 to the upstream side oscillator 11. The ultrasonic flow metering portion 10 measures the flow rate of the fluid circulated through the measurement flow channel 14 by using a difference between the propagation times.

Note that the transmission of the ultrasonic wave signals by the upstream side oscillator 11 and the downstream side oscillator 12 is controlled by the control portion 30 which is connected to the upstream side oscillator 11 and the downstream side oscillator 12 with signal lines 16 and 17, respectively, which are shown in FIG. 3. The ultrasonic wave signals received by the upstream side oscillator 11 and the downstream side oscillator 12 are transmitted to the control portion 30 via the signal lines 16 and 17. As described later, the control portion 30 calculates a difference between propagation times from transmission timings for the ultrasonic wave signals that are sent as instructions to the upstream side oscillator 11 and the downstream side oscillator 12 and reception timings for the ultrasonic wave signals received from the upstream side oscillator 11 and the downstream side oscillator 12 according to the transmission timings, and also calculates the flow rate of the fluid from the calculated difference between propagation times.

The flow rate adjusting portion 20 adjusts the flow rate of the fluid flowing out to the outflow port 100b which is connected to an outflow-side pipe (not shown) via the outflow-side flow channel portion 60 from the downstream side of the measurement flow channel 14. As shown in FIG.

1, the flow rate adjusting portion 20 is disposed between the ultrasonic flow metering portion 10 and the control portion 30 in an axis line Y direction corresponding to an installation direction orthogonal to the installation surface S. As shown in FIG. 1, in the axis line Y direction, the ultrasonic flow metering portion 10 is disposed at a position closest to the installation surface S, and the control portion 30 is disposed at a position farthest from the installation surface S. The flow rate adjusting portion 20 is disposed between the ultrasonic flow metering portion 10 and the control portion 30.

Figure 4:
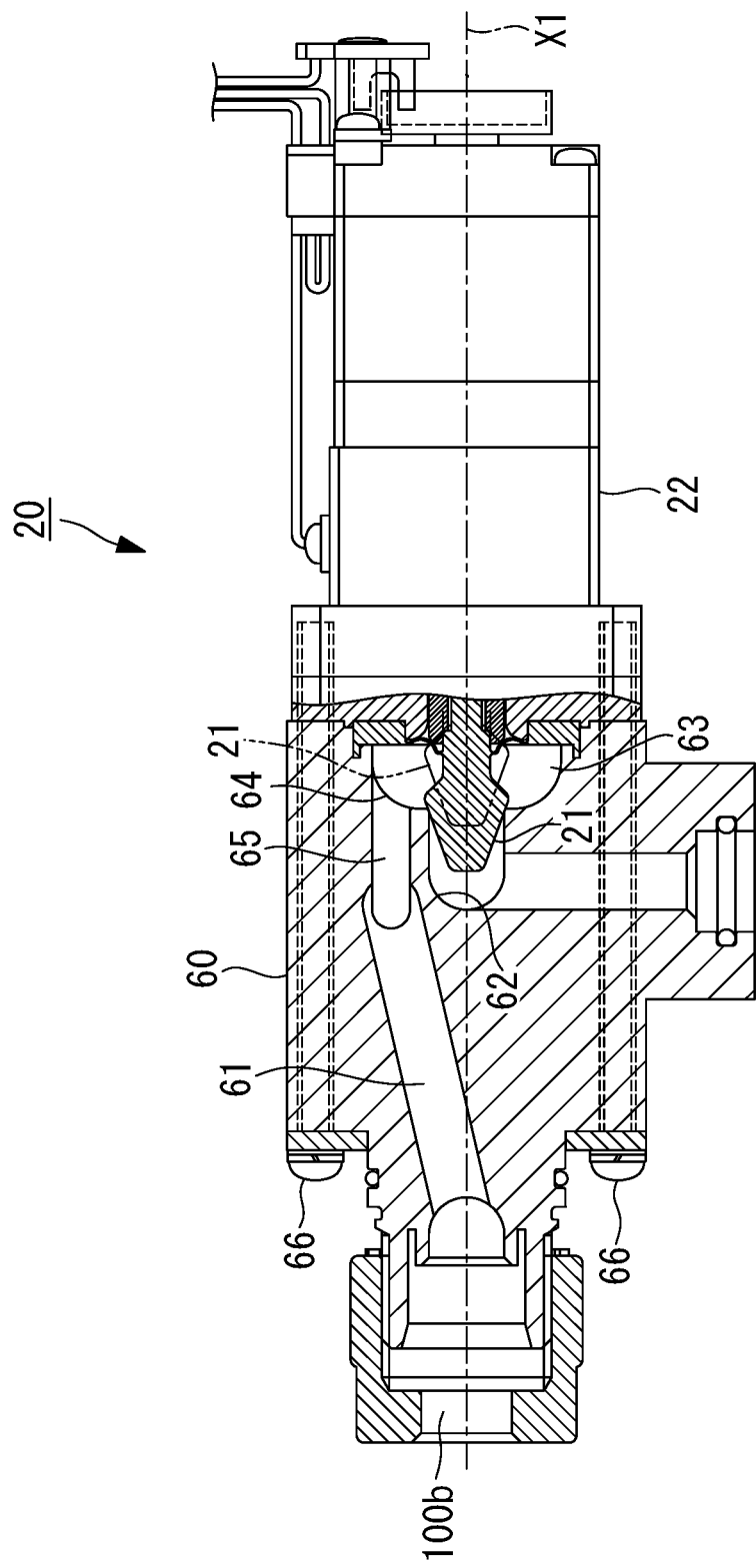
FIG. 4 is a partial longitudinal sectional view showing a flow rate adjusting portion and an outflow-side flow channel portion shown in FIG. 1.

As shown in FIG. 4, the flow rate adjusting portion 20 includes the valve body portion 21 which is inserted into a valve hole 62 that is formed in the outflow-side flow channel portion 60; and an electric driving portion 22 which causes the valve body portion 21 to advance or recede along the axis line X1 (first axis line) parallel to the installation surface S. The electric driving portion 22 causes the valve body portion 21 to advance or recede along the axis line X1 between a closed position indicated by a solid line shown in FIG. 4 and an open position indicated by a dashed line shown in FIG. 4. The flow rate adjusting portion 20 adjusts the amount of the fluid flowing into a valve chest 63 from the valve hole 62 in such a manner that the electric driving portion 22 adjusts the position of the valve body portion 21 on the axis line X1.

The control portion 30 controls the flow rate adjusting portion 20 on the basis of the flow rate of the fluid measured by the ultrasonic flow metering portion 10. The control portion 30 stores the set value of the target flow rate received from the external device via the cable 200, and controls the position of the valve body portion 21 of the flow rate adjusting portion 20 so that the flow rate of the fluid measured by the ultrasonic flow metering portion 10 matches the set value of the target flow rate.

The control portion 30 includes plate-like control boards 31 and 32 on which the above-mentioned functions are mounted. In this case, the control portion 30 includes two control boards, but instead may include at least one control board, such as one or three or more control boards. The control board 31 and the control board 32 are disposed along an axis line X3 (third axis line) parallel to the axis line X1 and the axis line X2. The positions in the axis line Y direction where the control board 31 and the control board 32 are disposed are positions farther from the installation surface S than the ultrasonic flow metering portion 10 and the flow rate adjusting portion 20.

The control portion 30 can instruct the upstream side oscillator 11 and the downstream side oscillator 12, respectively, which are included in the ultrasonic flow metering portion 10, to transmit ultrasonic wave signals. Further, the control portion 30 can detect a timing when the ultrasonic wave signal transmitted from one of the upstream side oscillator 11 and the downstream side oscillator 12 is received by the other one of the upstream side oscillator 11 and the downstream side oscillator 12.

The control portion 30 calculates a first propagation time from the transmission timing for the ultrasonic wave signal that is sent as an instruction to the downstream side oscillator 12 and the reception timing for the ultrasonic wave signal received by the upstream side oscillator 11 according to the transmission timing. Further, the control portion 30 calculates a second propagation time from the transmission timing for the ultrasonic wave signal that is sent as an instruction to the upstream side oscillator 11 and the reception timing for the ultrasonic wave signal received by the downstream side oscillator 12 according to the transmission timing. The control portion 30 obtains the flow rate of the fluid circulated through the measurement flow channel 14 on the basis of a predetermined flow rate arithmetic expression and a propagation time difference obtained by subtracting the second propagation time from the first propagation time.

As shown in FIG. 2, the housing portion 40 includes: a housing body 41 which accommodates the components of the flow rate adjusting device 100; a cap portion 42 which is attached to an upper portion of the housing body 41; and a partition member 43 which partitions an inside space formed by the housing body 41 and the cap portion 42.

The partition member 43 partitions the inside of the housing portion 40 into a space in which the ultrasonic flow metering portion 10 and the flow rate adjusting portion 20 are disposed, and a space in which the control portion 30 is disposed. The partition member 43 isolates the space in which the control portion 30 is disposed from the space through which the fluid is circulated. When the fluid is at a relatively high temperature (for example, in a range of 50° C. to 80° C.), the transmission of heat of the fluid to the control portion 30 can be prevented.

As shown in FIG. 1, the housing portion 40 is provided with an air introduction port 40a and an air discharge port 40b which are formed in order from the side close to the installation surface S along the axis line Y. The air introduction port 40a is a port for guiding an air supplied from an air supply source (not shown) into the housing portion 40. The air discharge port 40b is a port for discharging the air circulated in the housing portion 40 to the outside of the housing portion 40.

As indicated by an arrow in FIG. 1, the air introduced from the air introduction port 40a is circulated toward the inflow port 100a while cooling the lower surface of the control board 32. After that, the air is circulated toward the outflow port 100b while cooling the upper surface of the control board 32 and the upper and lower surfaces of the control board 31, and is finally discharged from the air discharge port 40b.

In this manner, the control board 31 and the control board 32 can be cooled by circulating the air in the housing portion 40. Furthermore, the upper and lower surfaces of each of the control board 31 and the control board 32 can be effectively cooled by circulating the air only in the space which is partitioned by the partition member 43 and in which the control portion 30 is disposed.

Figure 5:
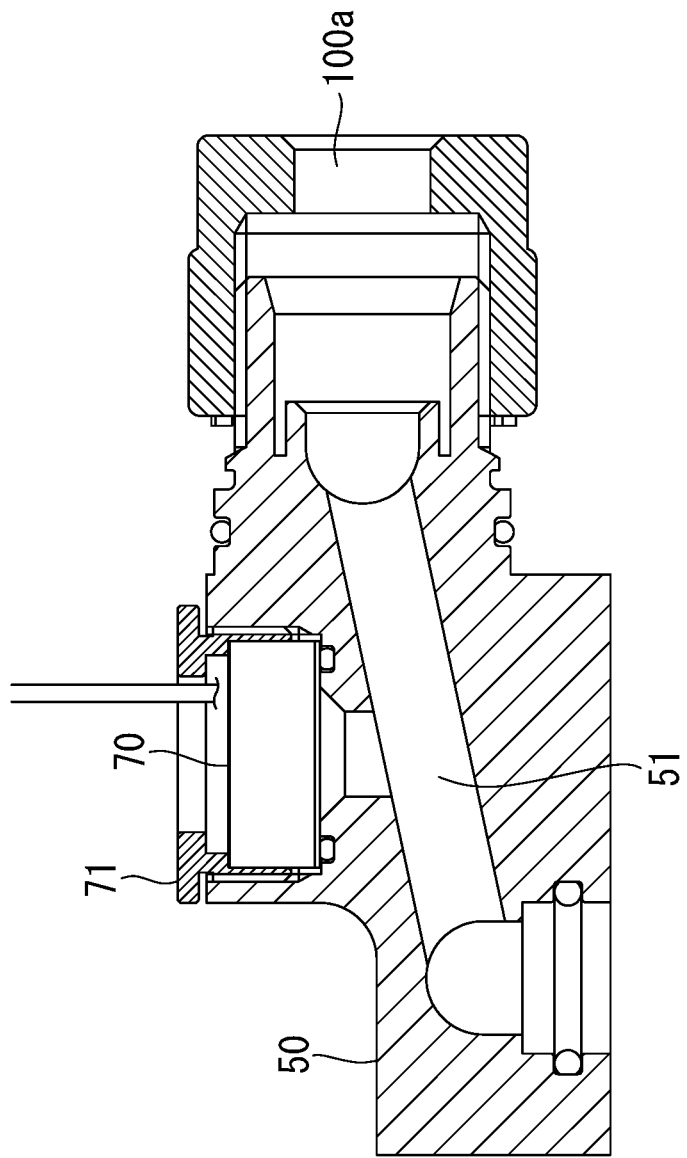
FIG. 5 is a longitudinal sectional view showing an inflow-side flow channel portion and a pressure sensor shown in FIG. 1.

As shown in FIGS. 1 and 5, the inflow-side flow channel portion 50 is a member in which an inflow-side inclined flow channel 51 that is inclined in a direction approaching the installation surface S from the inflow port 100a to the upstream side inflow channel 13 of the measurement flow channel 14 is formed inside. The inflow-side flow channel portion 50 is provided with the pressure sensor 70 for detecting the pressure of the fluid circulated through the inflow-side inclined flow channel 51.

When the installation surface S is a horizontal surface, the axis line Y direction corresponds to the vertical direction. In this case, the inflow-side flow channel portion 50 is disposed above the ultrasonic flow metering portion 10 in the vertical direction. Accordingly, even when the fluid circulated through the ultrasonic flow metering portion 10 contains air bubbles, the air bubbles are less likely to accumulate on the surface close to the upstream side oscillator 11 in the measurement flow channel 14. This is because the air bubbles are guided to the inflow-side flow channel portion 50 which is disposed above the surface close to the upstream side oscillator 11. Therefore, the occurrence of a malfunction that the flow rate is erroneously detected by the ultrasonic flow metering portion 10 due to the accumulation of air bubbles on the surface close to the upstream side oscillator 11 can be prevented.

As shown in FIGS. 1 and 4, the outflow-side flow channel portion 60 is a member in which an outflow-side inclined flow channel 61 that is inclined in a direction approaching the installation surface S from the flow rate adjusting portion 20 to the outflow port 100b is formed inside. The outflow-side flow channel portion 60 guides the fluid to the upstream side of the outflow-side inclined flow channel 61 via an outflow channel 65 from an opening 64 that is formed at an upper portion of the valve chest 63. The fluid guided to the upstream side of the outflow-side inclined flow channel 61 is further guided to the outflow port 100b along the outflow-side inclined flow channel 61.

As shown in FIGS. 2 and 4, the outflow-side flow channel portion 60 is provided with through-holes through which a plurality of fastening bolts 66 penetrate. The outflow-side flow channel portion 60 is fixed to the electric driving portion 22 by fastening the fastening bolts 66 to the electric driving portion 22.

When the installation surface S is a horizontal surface, the axis line Y direction corresponds to the vertical direction. In this case, the outflow-side flow channel portion 60 is disposed above the ultrasonic flow metering portion 10 in the vertical direction. Accordingly, even when the fluid circulated through the ultrasonic flow metering portion 10 contains air bubbles, the air bubbles are less likely to accumulate on the surface close to the downstream side oscillator 12 in the measurement flow channel 14. This is because the air bubbles are guided to the outflow-side flow channel portion 60 which is disposed above the surface close to the downstream side oscillator 12. Therefore, the occurrence of a malfunction that the flow rate is erroneously detected by the ultrasonic flow metering portion 10 due to the accumulation of air bubbles on the surface close to the downstream side oscillator 12 can be prevented.

The pressure sensor 70 measures the pressure (supply pressure) of the fluid flowing into the inflow-side inclined flow channel 51 at the upstream side of the measurement flow channel 14 from the inflow port 100a. The pressure sensor 70 is, for example, a strain gauge pressure sensor. The pressure sensor 70 is attached to the inflow-side flow channel portion 50 by a sensor holder 71. A pressure signal indicating the pressure of the fluid measured by the pressure sensor 70 is transmitted to the control portion 30 and stored in a storage portion (not shown) included in the control portion 30. The pressure signal is transmitted to the external device via the cable 200.

As shown in FIG. 2, the shield member 80 is a member which is made of metal (such as stainless steel) and disposed to surround the upstream side oscillator 11 and the downstream side oscillator 12. The shield member 80 prevents the occurrence of an error in the measurement by the ultrasonic flow metering portion 10 due to external magnetism or the like.

Next, a flow rate adjusting system in which the flow rate adjusting device 100 according to this embodiment is connected to an external device 300 via a cable 200 will be described.

Figure 6:
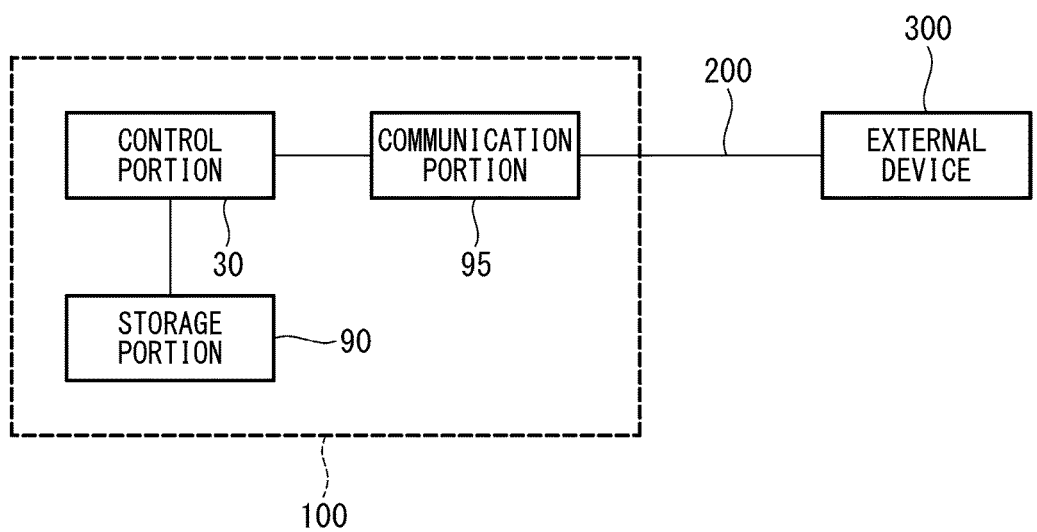
FIG. 6 is a block diagram showing a flow rate adjusting system according to this embodiment.

As shown in FIG. 6, the flow rate adjusting device 100 and the external device 300 are connected via the cable 200 in such a manner that the flow rate adjusting device 100 and the external device 300 can communicate with each other.

Further, as shown in FIG. 6, the flow rate adjusting device 100 according to this embodiment further includes a storage portion 90 and a communication portion 95, in addition to the components described above.

The storage portion 90 is a device that stores information which associates the flow rate (actual flow rate) of the fluid circulated in the measurement flow channel 14 that is obtained by the control portion 30, the set value of the target flow rate received from the external device 300, the opening degree of the valve body portion 21 that is obtained from the position of the valve body portion 21 caused to advance or recede by the drive portion 22, and the pressure of the fluid measured by the pressure sensor 70 with each other. The storage portion 90 is a device capable of repeatedly writing and reading information, and is configured of, for example, a non-volatile memory such as an EEPROM. Writing of information to the storage portion 90 and reading information therefrom are controlled by the control portion 30.

In this case, the opening degree of the valve body portion 21 refers to a degree that is set to 0% when the valve body portion 21 is brought into contact with the valve hole 62 and is brought into a fully closed state, and is set to 100% when the valve body portion 21 is located farthest from the valve hole 62. As the valve body portion 21 is spaced apart from the valve hole 62, the opening degree of the valve body portion 21 gradually increases from 0% to 100%.

The communication portion 95 is a device that is connected to the external device 300 via the cable (communication line) 200 and transmits and receives data between the control portion 30 and the external device 300.

The communication portion 95 can transmit, in real time, the flow rate (actual flow rate) of the fluid circulated in the measurement flow channel 14 that is obtained by the control portion 30, the opening degree of the valve body portion 21 that is obtained from the position of the valve body portion 21 caused to advance or recede by the drive portion 22, and the pressure of the fluid measured by the pressure sensor 70. The communication portion 95 can also transmit information read out from the storage portion 90 by the control portion 30.

Next, a screen displayed on a display portion (not shown) of the external device 300 will be described with reference to FIGS. 7 and 8.

Figure 7:
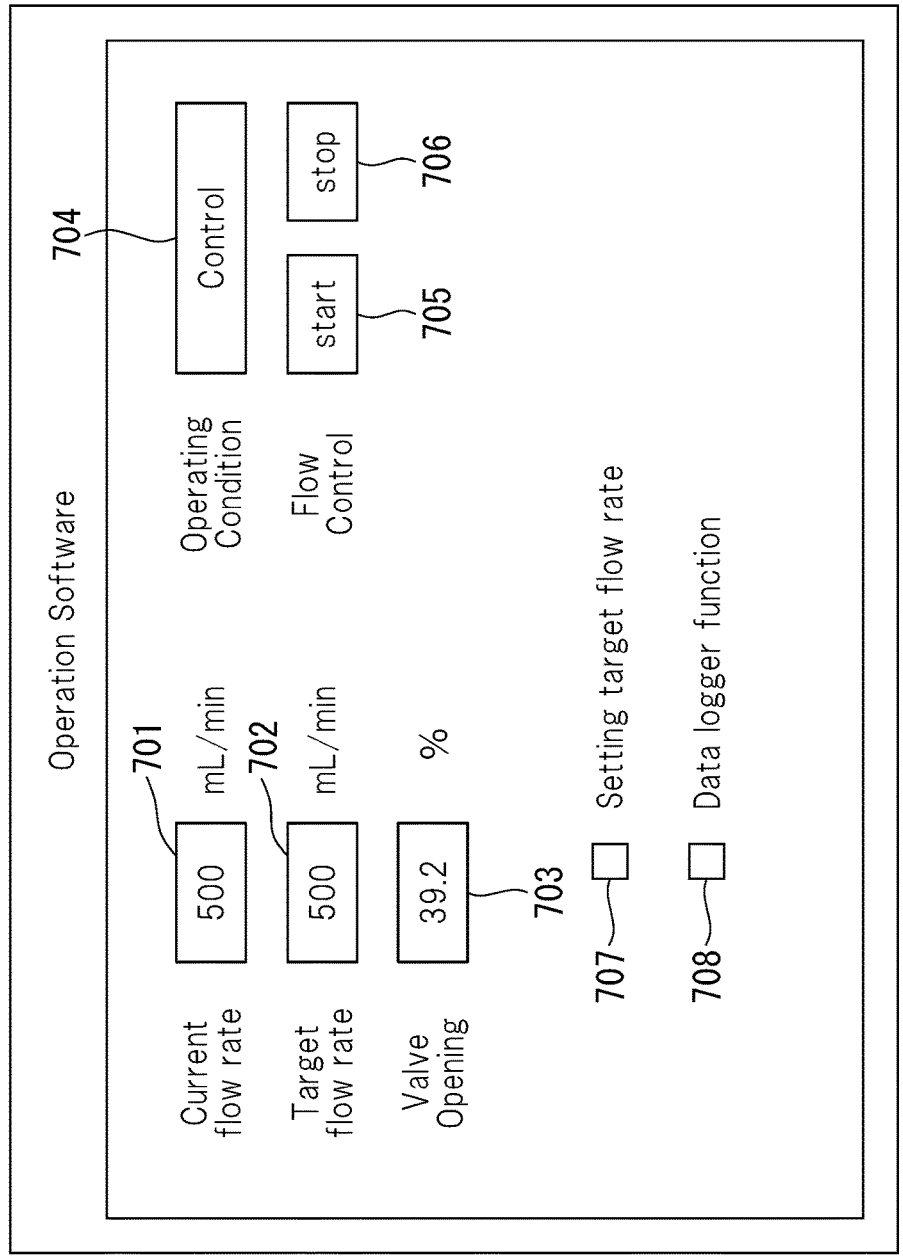
FIG. 7 is a diagram showing an example of a screen displayed on a display portion of an external device.

As shown in FIG. 7, on the screen displayed on the display portion of the external device 300, the flow rate (actual flow rate; Current flow rate) of the fluid circulated in the measurement flow channel 14 that is obtained by the control portion 30 is displayed in a numerical field 701. In a numerical field 702, the set value of the target flow rate set value (Target flow rate) that is preliminarily set by the operator of the external device 300 is displayed. In a numerical field 703, the opening degree (Valve Opening) of the valve body portion 21 that is obtained from the position of the valve body portion 21 caused to advance or recede by the drive portion 22 is displayed.

Further, as shown in FIG. 7, on the screen displayed on the display portion of the external device 300, one of characters for a control state (Control) in which the control portion 30 controls the flow rate adjusting portion 20 and a stop state (Stop) in which the flow rate adjusting portion 20 is not controlled is displayed in a text field 704.

When a button 705 on the display screen shown in FIG. 7 is depressed by an input device, such as a mouse, "Control" is displayed in the text field 704. When a button 706 is depressed, "Stop" is displayed in the text field 704.

When the button 705 is depressed, the external device 300 transmits, to the communication portion 95 of the flow rate adjusting device 100, a control start signal for causing the control portion 30 to operate so that the flow rate of the fluid circulated in the measurement flow channel 14 matches the set value of the target flow rate displayed in the numerical field 702. When the communication portion 95 receives the control start signal, the control portion 30 of the flow rate adjusting device 100 controls the flow rate adjusting portion 20 so that the flow rate of the fluid circulated in the measurement flow channel 14 matches the set value of the target flow rate displayed in the numerical field 702.

Further, when the button 706 is depressed, the external device 300 transmits, to the communication portion 95 of the flow rate adjusting device 100, a control stop signal for causing the control portion 30 to operate so that the flow rate of the fluid circulated in the measurement flow channel 14 becomes zero. When the communication portion 95 receives the control stop signal, the control portion 30 of the flow rate adjusting device 100 controls the flow rate adjusting portion 20 so that the flow rate of the fluid circulated in the measurement flow channel 14 becomes zero.

A checkbox 707 shown in FIG. 7 is a checkbox for setting the set value of the target flow rate displayed in the numerical field 702. When the checkbox 707 on the display screen shown in FIG. 7 is depressed by the input device, such as the mouse, another screen (not shown) is displayed and the operator inputs the set value of the target flow rate via the screen.

A checkbox 708 shown in FIG. 7 is a checkbox for setting a data logger function. When the checkbox 708 on the display screen shown in FIG. 7 is depressed by the input device, such as the mouse, another screen shown in FIG. 8 is displayed and the data logger function is set via the screen.

Figure 8:
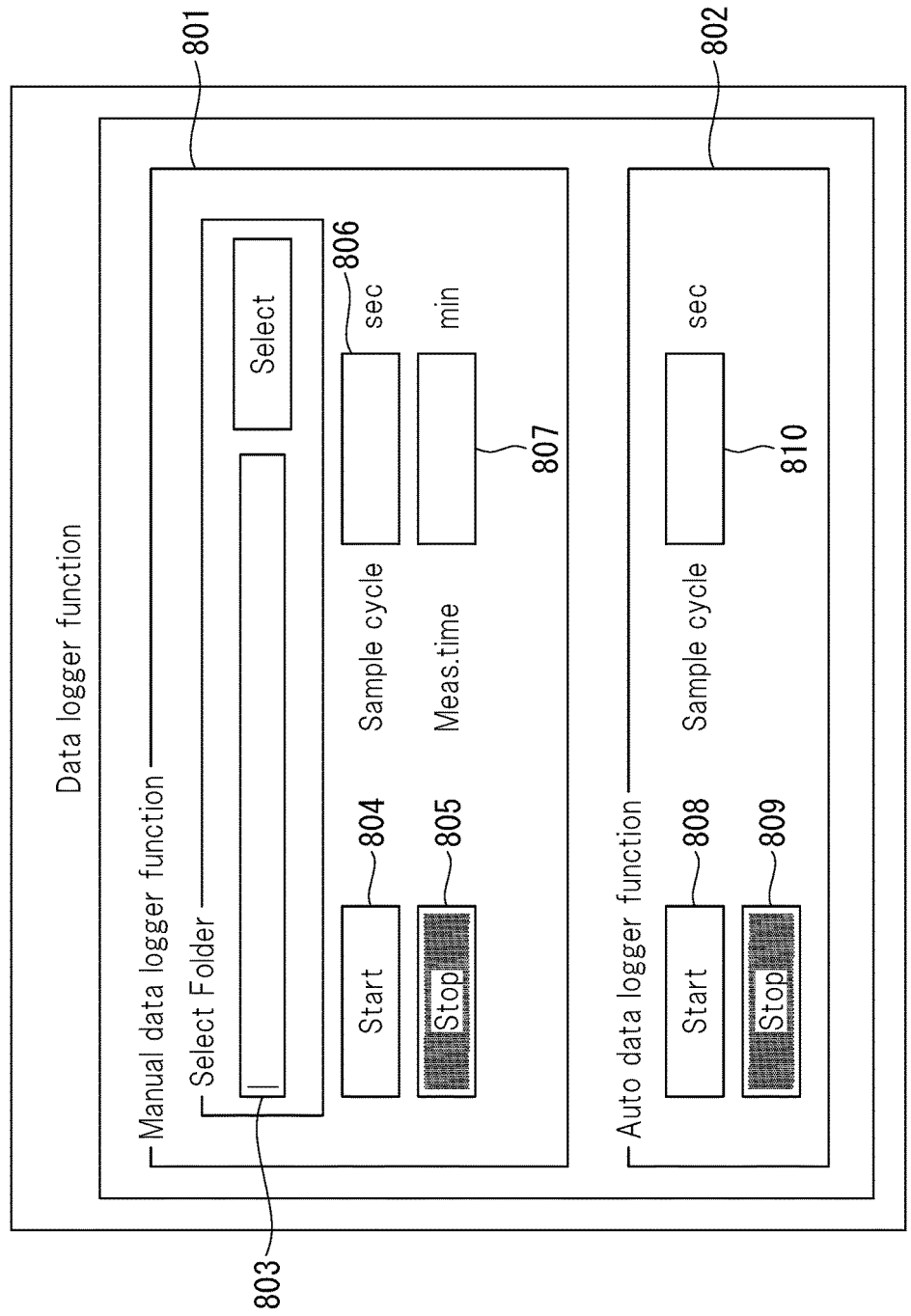
FIG. 8 is a diagram showing an example of the screen displayed on the display portion of the external device.

On the screen shown in FIG. 8, a field 801 is a field for setting a manual data logger function, and a field 802 is a field for setting an auto data logger function.

The manual data logger function is a function of storing, in a storage portion (not shown) of the external device 300, information received by the external device 300 from the flow rate adjusting device 100 via the cable 200. On the other hand, the auto data logger function is a function of storing information in the storage portion 90 included in the flow rate adjusting device 100. The flow rate adjusting device 100 can execute the auto data logger function and store information in the storage portion 90 even when the external device 300 is not connected via the cable 200.

In the field 801 for setting the manual data logger function, a text field 803 is a field for inputting information about a storage destination for selecting whether or not to store information in which one of the areas of the storage portion (not shown) included in the external device 300.

In the field 801, a button 804 is a button for starting the execution of the manual data logger function, and a button 805 is a button for stopping the execution of the manual data logger function. FIG. 8 illustrates a state where the button 805 is selected.

In the field 801 for setting the manual data logger function, a numerical field 806 is a field for inputting a sampling period that is acquired from the flow rate adjusting device 100 by the manual data logger function and is stored. A numerical field 807 is a field for inputting a period that is acquired from the flow rate adjusting device 100 by the manual data logger function and is stored.

When the manual data logger function is executed, the external device 300 acquires information from the flow rate adjusting device 100 in the sampling period input in the numerical field 806, and stores the information, which is acquired from the flow rate adjusting device 100 during the period input in the numerical field 807, in the storage destination input in the text field 803.

In the field 802 for setting the auto data logger function, a button 808 is a button for starting the execution of the auto data logger function, and a button 809 is a button for stopping the execution of the auto data logger function. FIG. 8 illustrates a state where the button 809 is selected.

In the field 802 for setting the auto data logger function, a numerical field 810 is a field for inputting a sampling period in which the flow rate adjusting device 100 stores information in the storage portion 90 by the manual data logger function.

When the button 808 is depressed, the external device 300 transmits, to the communication portion 95, a control signal for causing the flow rate adjusting device 100 to execute the auto data logger function. When the communication portion 95 receives the control signal for executing the auto data logger function, the control portion 30 of the flow rate adjusting device 100 controls the storage portion 90 to store information in the sampling period input in the numerical field 806.

Next, a process for the auto data logger function executed by the flow rate adjusting device 100 when an operator who operates the external device 300 sends an instruction for causing the flow rate adjusting device 100 to execute the auto data logger function will be described.

Figure 9:
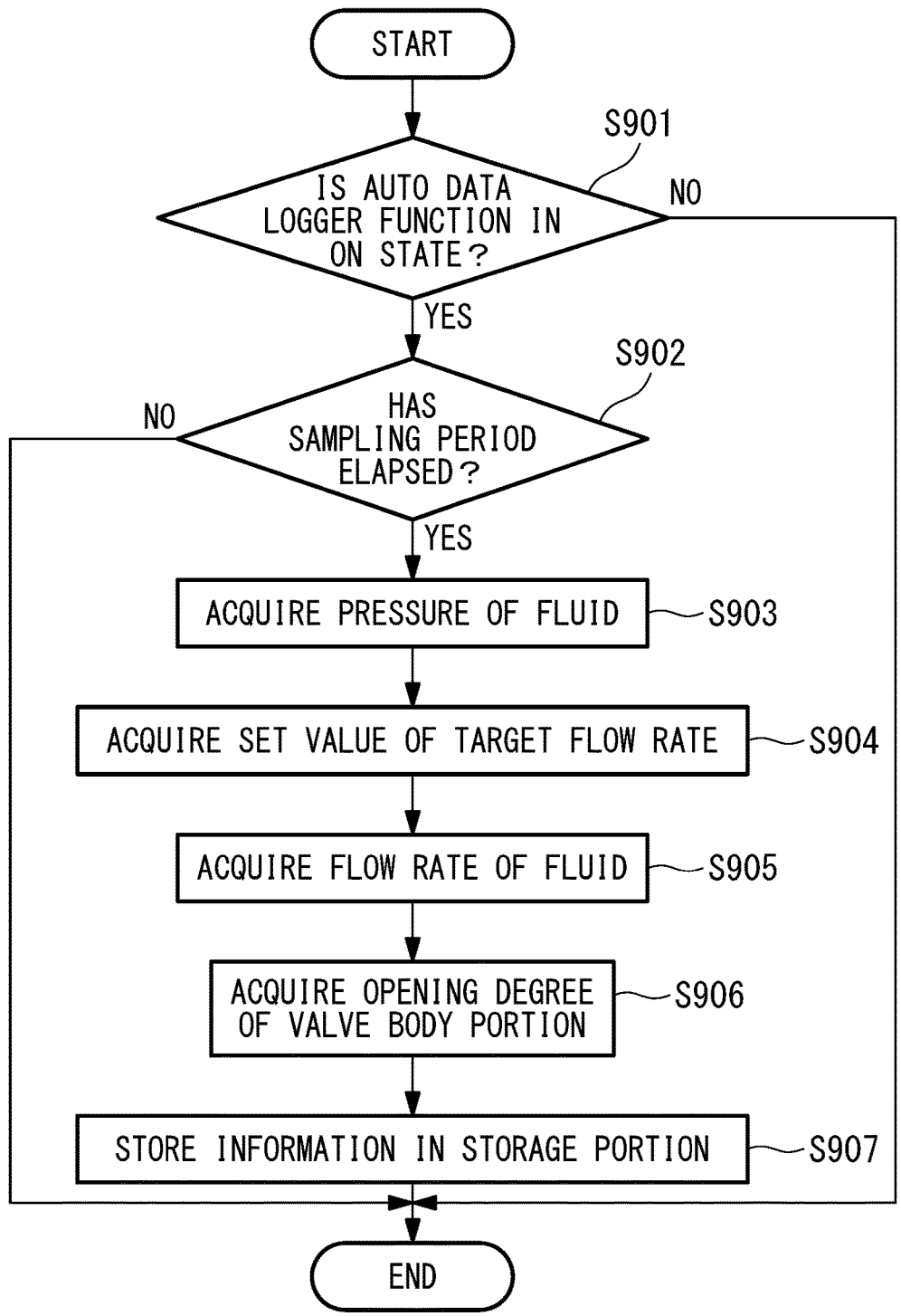
FIG. 9 is a flowchart showing a process for an auto data logger function executed by the flow rate adjusting device according to this embodiment.

The process shown in FIG. 9 is a process carried out in such a manner that the control portion 30 reads out a program stored in a ROM (not shown) or the like and executes the program.

When the button 808 is depressed on the display screen shown in FIG. 8, the external device 300 transmits, to the communication portion 95, a control signal for causing the flow rate adjusting device 100 to execute the auto data logger function. Further, the external device 300 transmits, to the communication portion 95, the set value of the target flow rate and the sampling period input in the numerical field 810.

When the button 809 is depressed in the field 802 for setting the auto data logger function displayed on the display portion, the external device 300 transmits a control signal for stopping the execution of the auto data logger function to the flow rate adjusting device 100.

In step S901 shown in FIG. 9, the control portion 30 judges whether or not the auto data logger function is in an ON state. When the auto data logger function is in the ON state, the control portion 30 advances the process to step S902. When judging that the auto data logger function is in an OFF state, the control portion 30 interrupts the process shown in FIG. 9 and starts the process shown in FIG. 9 again. When the communication portion 95 receives the control signal for causing the flow rate adjusting device 100 to execute the auto data logger function from the external device 300, the control portion 30 judges whether or not the auto data logger function is in the ON state.

In step S902, the control portion 30 judges whether or not the sampling period received by the communication portion 95 from the external device 300 has elapsed. If the judgment result shows YES, the control portion 30 advances the process to step S903. When judging that the sampling period has not elapsed, the control portion 30 interrupts the process shown in FIG. 9 and starts the process shown in FIG. 9 again.

Note that a timer (not shown) for measuring the sampling period measures the sampling period independently of the process shown in FIG. 9. If the judgement result in step S902 indicates YES, the timer initializes the measured time to zero and measures the sampling period again.

When the auto data logger function is in the ON state the sampling period has elapsed, the control portion 30 executes the auto data logger function shown in the following steps S903 to S907.

The control portion 30 acquires the pressure of the fluid measured by the pressure sensor 70 in step S903, acquires the received set value of the target flow rate in step S904, acquires the flow rate of the fluid circulated in the measurement flow channel 14 in step S905, and acquires the valve opening degree of the valve body portion 21 in step S906.

In step S907, the control portion 30 causes the storage portion 90 to store information that associates the pressure of the fluid measured by the pressure sensor 70, the set value of the target flow rate, the flow rate of the fluid, and the valve opening degree of the valve body portion 21 with each other, and terminates the process shown in FIG. 9.

In the above description of the flowchart shown in FIG. 9, the set value of the target flow rate is transmitted from the external device 300, and the flow rate adjusting device 100 stores the set value of the target flow rate in the storage portion 90. However, other modes may also be employed. For example, even if the set value of the target flow rate is not transmitted from the external device 300, the auto data logger function may be executed when flow rate adjusting device 100 receives the control signal for executing the auto data logger function. In this case, the flow rate adjusting device 100 acquires the pressure of the fluid, the flow rate of the fluid, and the valve opening degree of the valve body portion 21, and stores the pressure of the fluid, the flow rate of the fluid, and the valve opening degree in the storage portion 90. Even when the set value of the target flow rate is not transmitted from the external device 300, the flow rate adjusting device 100 stores the set value of the target flow rate in the storage portion 90. In this case, the set value of the target flow rate to be stored in the storage portion 90 is 0 (zero).

Figure 10:
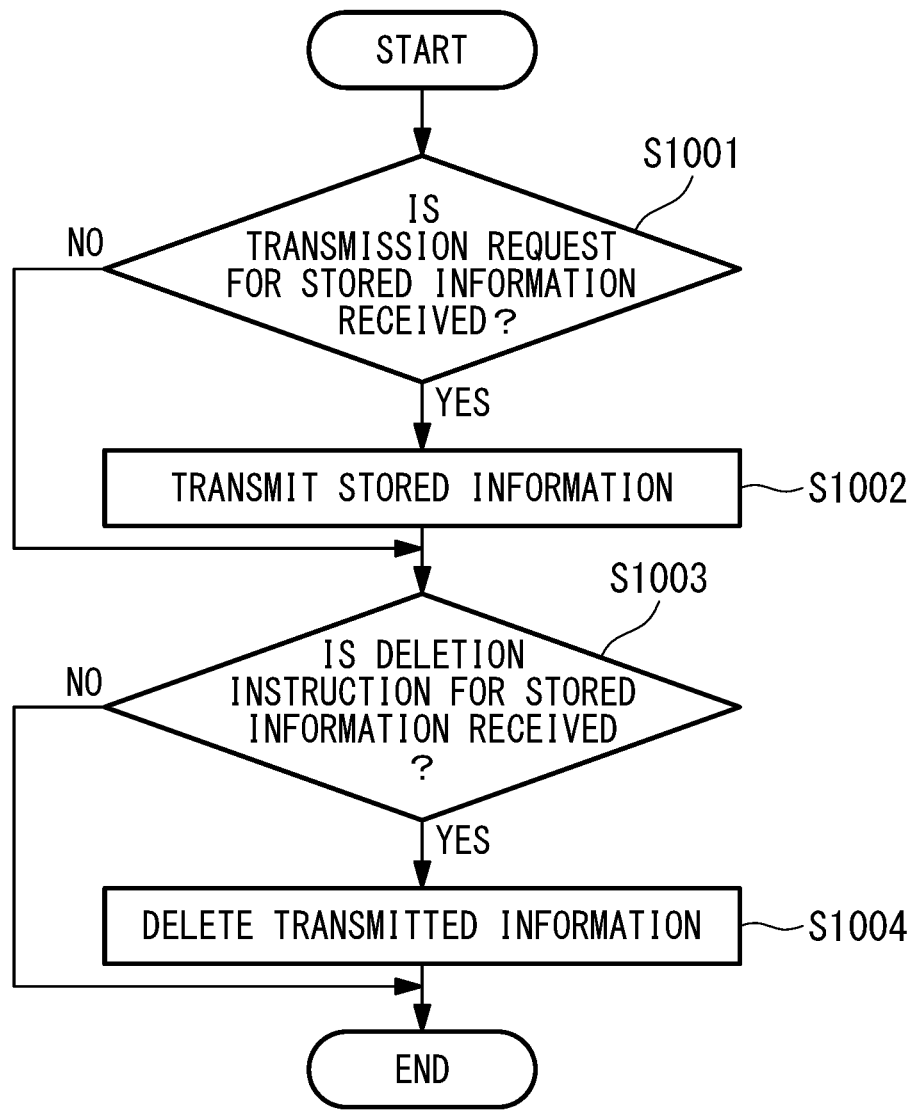
FIG. 10 is a flowchart showing a process in which the flow rate adjusting device according to this embodiment transmits information stored in a storage portion to the external device.

Next, a process in which the information stored in the storage portion 90 by the auto data logger function is transmitted to the external device 300 and is thereafter deleted will be described with reference to FIG. 10. The process shown in FIG. 10 is a process carried out in such a manner that the control portion 30 reads out a program stored in a ROM (not shown) or the like and executes the program.

In step S1001, the control portion 30 judges whether or not the communication portion 95 has received the transmission request for transmitting the information stored in the storage portion 90 from the external device 300. If the judgment result shows YES, the control portion 30 advances the process to step S1002.

In step S1002, the control portion 30 controls the communication portion 95 to transmit the information stored in the storage portion 90 to the external device 300. In this case, the information stored in the storage portion 90 is information that associates the pressure of the fluid measured by the pressure sensor 70, the set value of the target flow rate, the flow rate of the fluid, and the valve opening degree of the valve body portion 21 with each other. The external device 300 receives the information transmitted from the communication portion 95, and transmits, to the communication portion 95 of the flow rate adjusting device 100, the deletion instruction for deleting the received information which is confirmed to have been received.

In step S1003, the control portion 30 judges whether or not the deletion instruction transmitted from the external device 300 has been received. If the judgment result shows YES, the control portion 30 advances the process to step S1004.

In step S1004, the control portion 30 performs control in such a manner that the transmitted information specified by the deletion instruction transmitted from the external device 300 is deleted from the storage portion 90.

If the judgment result in step S1001 and step S1003 shows NO, the control portion 30 interrupts the process shown in FIG. 10 and starts the process shown in FIG. 10 again.

By executing the process shown in FIG. 10, the information stored in the storage portion 90 by the auto data logger function can be transmitted to the external device 300. The operator of the external device 300 that has received the information from the flow rate adjusting device 100 analyzes the received information, thereby making it possible to discriminate an abnormality occurring in the flow rate adjusting device 100.

Figure 11:
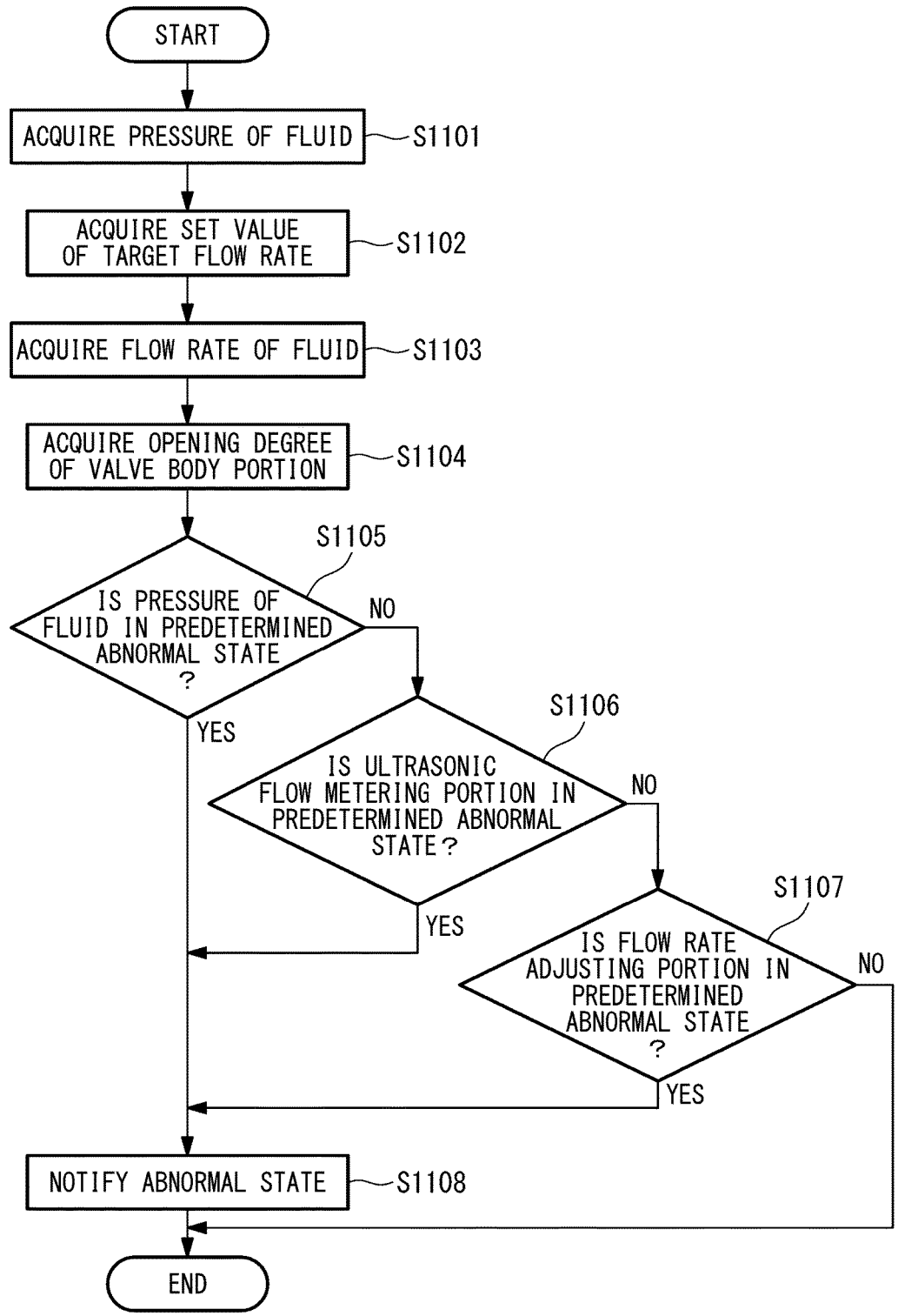
FIG. 11 is a flowchart showing a process in which the flow rate adjusting device according to this embodiment judges and notifies an abnormal state.

Next, a process in which the flow rate adjusting device 100 judges and notifies the abnormal state will be described. The process shown in FIG. 11 is a process carried out in such a manner that the control portion 30 reads out a program stored in a ROM (not shown) or the like and executes the program.

The control portion 30 acquires the pressure of the fluid measured by the pressure sensor 70 in step S1101, acquires the set value of the target flow rate in step S1102, acquires the flow rate of the fluid circulated in the measurement flow channel 14 in step S1103, and acquires the valve opening degree of the valve body portion 21 in step S1104.

The control portion 30 sets the set value of the target flow rate acquired in step S1102, and starts the flow rate adjustment by the flow rate adjusting portion 20.

In step S1105, the control portion 30 judges whether or not the acquired pressure of the fluid is in a predetermined abnormal state. If the judgement result shows NO, the control portion 30 advances the process to step S1106. If the judgement result shows YES, the control portion 30 advances the process to step S1108.

In the judgement in step S1105, the predetermined abnormal state refers to one of the following states. That is, a state where the acquired pressure of the fluid is maintained at a first predetermined pressure or lower (for example, 10 kPa or lower), a state where the acquired pressure of the fluid is maintained at a second predetermined pressure or higher (for example, 500 kPa or higher), and a state where a variation per unit time (for example, 0.5 to 1.0 seconds) of the acquired pressure exceeds a predetermined amount (for example, 50 kPa).

The state where the acquired pressure of the fluid is maintained at the second predetermined pressure or higher is a state where the flow rate adjustment by the flow rate adjusting portion 20 cannot be appropriately performed. In this case, for example, even when the target flow rate is set to 0 to bring the valve body portion 21 into the closed state, the valve body portion 21 cannot be brought into the closed state due to the fluid with a high pressure.

The state where a variation per unit time of the acquired pressure exceeds the predetermined amount refers to, for example, an overshoot state in which the pressure of the fluid rapidly increases, an undershoot state in which the pressure of the fluid rapidly decreases, or a pulsating state in which the pressure of the fluid periodically fluctuates.

In step S1106, the control portion 30 judges whether or not the ultrasonic flow metering portion 10 is in the predetermined abnormal state. If the judgement result shows NO, the control portion 30 advances the process to step S1107. If the judgement result shows YES, the control portion 30 advances the process to step S1108.

In the judgment in step S1106, the predetermined abnormal state refers to, for example, a state where the flow rate of the fluid acquired in step S1102 is zero even though the opening degree of the valve body portion 21 acquired in step S1104 indicates an open state.

In step S1107, the control portion 30 judges whether or not the flow rate adjusting portion 20 is in the predetermined abnormal state. If the judgement result shows NO, the control portion 30 terminates the process of the flowchart. If the judgement result shows YES, the control portion 30 advances the process to step S1108.

In the judgement in step S1107, the predetermined abnormal state refers to, for example, a state where the opening degree of the valve body portion 21 acquired in step S1104 remains constant even though there is a difference of a certain amount or more between the set value of the target flow rate acquired in step S1102 and the flow rate of the fluid acquired in step S1103.

In step S1108, the control portion 30 judges that the pressure of the fluid is in the predetermined abnormal state in step S1105, the control portion 30 notifies the predetermined abnormal state. Further, when the control portion 30 judges that the ultrasonic flow metering portion 10 is in the predetermined abnormal state in step S1106, the control portion 30 notifies the predetermined abnormal state. Further, when the control portion 30 judges that the flow rate adjusting portion 20 in the predetermined abnormal state in step S1107, the control portion 30 notifies the abnormal state.

The notification of the abnormal state by the control portion 30 is performed by a method of displaying information corresponding to each abnormal state on the display portion (not shown) included in the flow rate adjusting device 100, a method of issuing an alarm sound corresponding to each abnormal state by a buzzer (not shown), a notification method using a blinking state of a light source (not shown) corresponding to each abnormal state, or the like.

Next, specific examples of the pressure of the fluid measured by the pressure sensor 70, the set value of the target flow rate, the flow rate (actual flow rate) of the fluid circulated in the measurement flow channel 14, and the opening degree of the valve body portion 21 will be described with reference to FIGS. 12 to 15.

Figure 12:
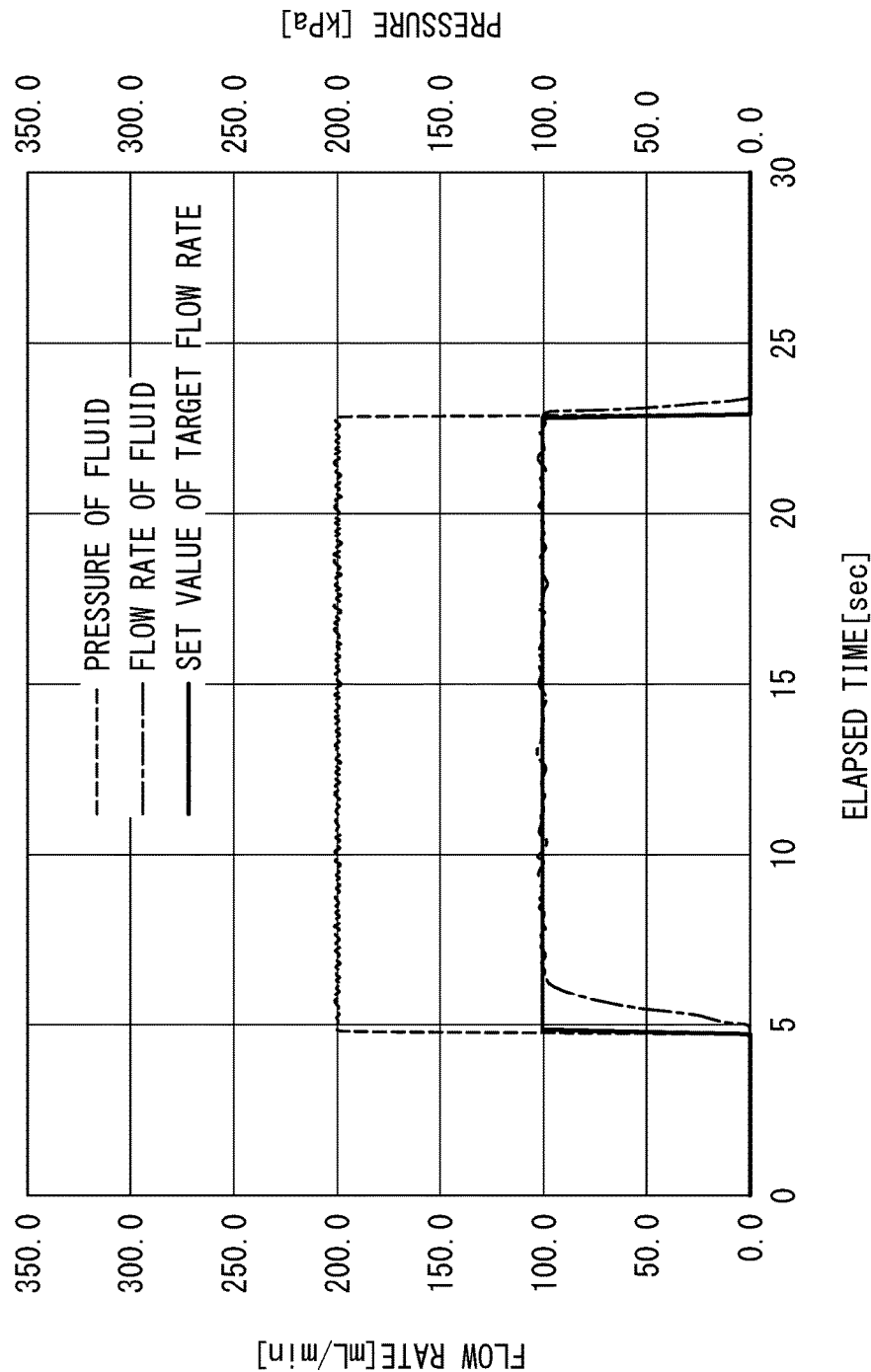
FIG. 12 is a graph showing a change with elapsed time of each of a pressure of a fluid measured by a pressure sensor, a set value of a target flow rate, and the flow rate of the fluid circulated in a measurement flow channel.
Figure 13:
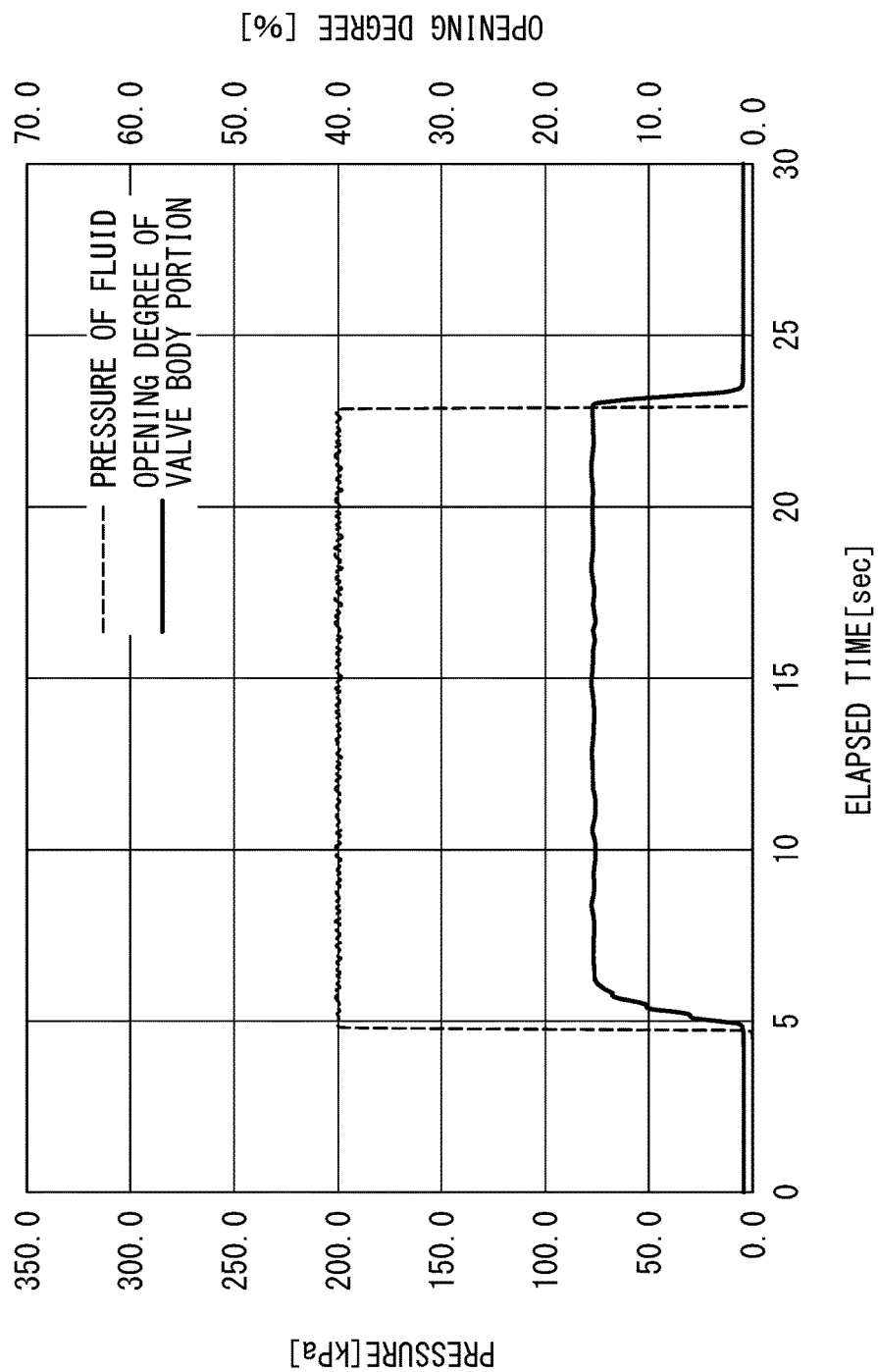
FIG. 13 is a graph showing a change with elapsed time of each of the pressure of the fluid measured by the pressure sensor and an opening degree of a valve body portion.

FIGS. 12 and 13 illustrate an example in which the pressure of the fluid measured by pressure sensor 70 is in a normal state. FIG. 12 is a graph showing a change with elapsed time of each of the pressure of the fluid measured by the pressure sensor 70, the set value of the target flow rate, and the flow rate (actual flow rate) of the fluid circulated in the measurement flow channel 14. FIG. 13 is a graph showing a change with elapsed time of each of the pressure of the fluid measured by the pressure sensor 70 and the opening degree of the valve body portion 21.

Figure 14:
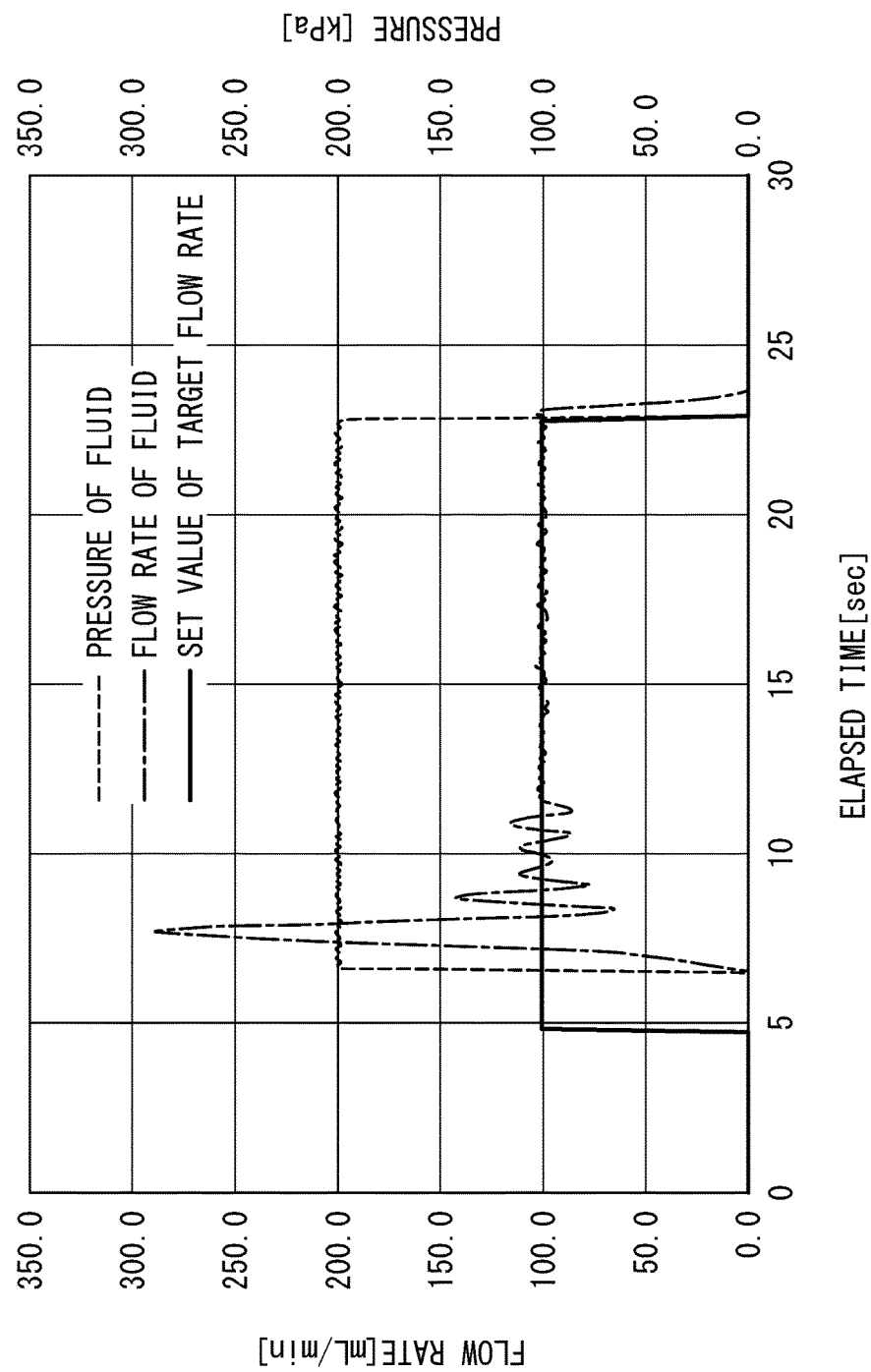
FIG. 14 is a graph showing a change with elapsed time of each of the pressure of the fluid measured by the pressure sensor, the set value of the target flow rate, and the flow rate of the fluid circulated in the measurement flow channel.
Figure 15:
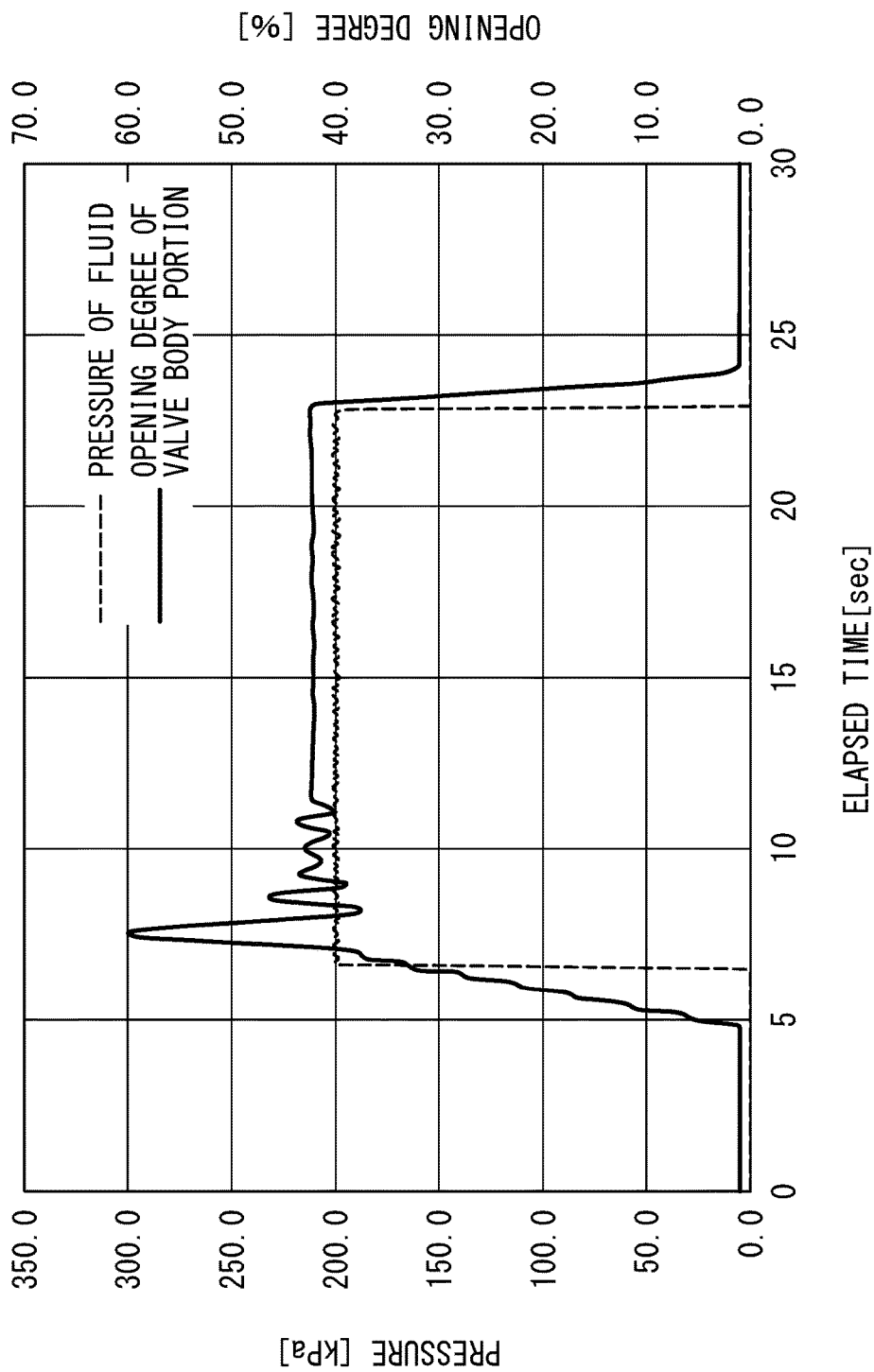
FIG. 15 is a graph showing a change with elapsed time of each of the pressure of the fluid measured by the pressure sensor and the opening degree of the valve body portion.

On the other hand, FIGS. 14 and 15 illustrate an example in which the pressure of the fluid measured by pressure sensor 70 is in the predetermined abnormal state. FIG. 14 is a graph showing a change with elapsed time of each of the pressure of the fluid measured by the pressure sensor 70, the set value of the target flow rate, and the flow rate (actual flow rate) of the fluid circulated in the measurement flow channel 14. FIG. 15 is a graph showing a change with elapsed time of each of the pressure of the fluid measured by the pressure sensor 70 and the opening degree of the valve body portion 21.

When FIG. 12 and FIG. 14 are compared, in both cases of FIGS. 12 and 14, the set value of the target flow rate increases from 0 (mL/min) to 100 (mL/min) in the vicinity of an elapsed time of five seconds, and then the set value of the target flow rate decreases from 100 (mL/min) to 0 (mL/min) in the vicinity of an elapsed time of 23 seconds. This indicates that the control portion 30 controls the flow rate adjusting portion 20 by setting the set value of the target flow rate to 100 (mL/min) during a period from the vicinity of the elapsed time of five seconds to the vicinity of the elapsed time of 23 seconds.

On the other hand, in the case of FIG. 12, the pressure of the fluid increases from 0 (kPa(G)) to 200 (kPa(G)) in synchronization with an increase of the set value of the target flow rate in the vicinity of the elapsed time of five seconds, while in the case of FIG. 14, the pressure of the fluid increases from 0 (kPa(G)) to 200 (kPa (G)) in asynchronous with an increase of the set value of the target flow rate at a timing when about two seconds are delayed from the elapsed time of five seconds. In this case, G represents a gauge pressure based on the atmospheric pressure.

This indicates that the supply of the fluid to the inflow port 100*a* is delayed by about two seconds from the timing when the set value of the target flow rate is increased. The predetermined abnormal state shown in FIGS. 14 and 15 refers to a state where the pressure measured by the pressure sensor 70 is maintained at the predetermined pressure or lower when the control portion 30 starts the control of the flow rate adjusting portion 20 based on the set value of the target flow rate.

As shown in FIG. 12, when the pressure of the fluid measured by the pressure sensor 70 is in the normal state and the set value of the target flow rate of 100 (mL/min) is set, the flow rate of the fluid circulated in the measurement flow channel 14 increases accordingly, and after about two seconds, the set value of the target flow rate of 100 (mL/min) is maintained. The flow rate of the fluid circulated in the measurement flow channel 14 increases. This is because when the set value of the target flow rate is set to 100 (mL/min) as shown in FIG. 13, the opening degree of the valve body portion 21 increases so that the difference between the actual flow rate and the target flow rate is reduced.

On the other hand, as shown in FIG. 14, when the pressure of the fluid measured by the pressure sensor 70 is in the predetermined abnormal state, even if the set value of the target flow rate of 100 (mL/min) is set, the flowrate of the fluid circulated in the measurement flow channel 14 does not increase and is maintained at 0 (mL/min) for about two seconds. This is because the supply of the fluid supplied to the inflow port 100*a* is delayed by about two seconds from the timing when the set value of the target flow rate is increased. The flow rate of the fluid circulated in the measurement flow channel 14 rapidly increases to about three-fold of 100 (mL/min), which is the set value of the target flow rate, after a lapse of about seven seconds, and then the flow rate repeatedly increases or decreases during a period of about five seconds and thereafter maintained at the set value of the target flow rate.

The flow rate of the fluid circulated in the measurement flow channel 14 rapidly increases after a lapse of about seven seconds. This is because, as shown in FIG. 15, at the time when about seven seconds have elapsed, the opening degree of the valve body portion 21 is equal to or more than 30%. The reason why the opening degree of the valve body portion 21 is equal to or more than 30% is that, although the set value of the target flow rate is set to 100 (mL/min) at the time when about five seconds have elapsed, the actual flow rate is maintained at 0 (mL/min), so that the opening degree of the valve body portion 21 is increased to decrease the difference between the actual flow rate and the target flow rate.

According to the examples shown in FIGS. 12 to 15 described above, the information that associates not only the flow rate of the fluid, the set value of the target flow rate, and the opening degree of the valve body portion, but also the pressure of the fluid, is analyzed, so that it can be analyzed whether an abnormality occurring in the flow rate adjusting device 100 is caused because the pressure of the fluid is in the predetermined abnormal state, or because the ultrasonic flow metering portion 10 or the flow rate adjusting portion 20 is in the predetermined abnormal state.

In this embodiment, the information stored in the storage portion 90 is transmitted to the external device 300 by the flow rate adjusting device 100, which enables the operator of the external device 300 to analyze the abnormal state by referring to the information. Further, the flow rate adjusting device 100 itself judges the abnormal state, thereby making it possible to notify the operator of the flow rate adjusting device 100 of the abnormal state.

The operation and effects of the flow rate adjusting device 100 of this embodiment described above will be described.

According to the flow rate adjusting device 100 of this embodiment, when the propagation time difference between ultrasonic waves transmitted from the pair of oscillators 11 and 12 of the ultrasonic flow metering portion 10 is measured to obtain the flow rate of the fluid circulated in the straight tube-shaped measurement flow channel 14, the pressure of the fluid flowing into the upstream side of the measurement flow channel 14 is measured by the pressure sensor 70. The pressure measured by the pressure sensor 70 is stored in the storage portion 90 as information that associates the flow rate of the fluid obtained from the propagation time difference measured by the ultrasonic flow metering portion 10 and the set value preliminarily set with each other, when the control portion 30 controls the flow rate adjusting portion 20.

When such an abnormality that the flow rate of the fluid obtained from the propagation time difference measured by the ultrasonic flow metering portion 10 does not change even when the set value of the target flow rate is set occurs in the flow rate adjusting device 100, it can be determined whether the abnormality is an abnormality due to the pressure of the fluid, or an abnormality in the flow rate adjusting device 100 itself, by referring to the information stored in the storage portion 90 by the external device 300.

For example, when the fluid does not flow into the inflow port 100*a* and when the flow rate of the fluid obtained from the propagation time difference is zero, it can be recognized that the fluid is maintained in the atmospheric pressure state without being guided to the measurement flow channel 14, based on the information stored in the storage portion. In this case, it can be determined that the cause of the abnormality that the flow rate of the fluid obtained from the propagation time difference measured by the ultrasonic flow metering portion 10 is zero is due to the pressure of the fluid maintained in the atmospheric pressure state without being guided to the measurement flow channel 14.

Thus, according to the flow rate adjusting device 100 of this embodiment, the flow rate adjustment can be performed based on the measurement of the flow rate by the ultrasonic flow metering portion 10 included in the straight tube-shaped measurement flow channel 14 and the measurement result, and the abnormality due to the pressure of the fluid can be determined.

Further, in the flow rate adjusting device according to this embodiment, the flow rate adjusting portion 20 includes: the valve body portion 21 inserted into the valve hole 62 formed in the outflow-side flow channel portion 60 which guides the fluid to the outflow port 100*b*; and the drive portion 22 that causes to advance or recede the valve body portion 21 along the central axis (axis line X1) of the valve hole 62. When the control portion 30 controls the flow rate adjusting portion 20, the storage portion 90 stores, in a manner associated with each other, the opening degree of the valve body portion 21 that is obtained from the position of the valve body portion 21 caused to advance or recede by the drive portion 22, and the pressure measured by the pressure sensor 70.

With this structure, for example, if such an abnormality that the flow rate of the fluid obtained from the propagation time difference measured by the ultrasonic flow metering portion 10 does not change, even when the set value of the target flow rate is set, while the opening degree of the valve body portion 21 increases, occurs in the flow rate adjusting device 100, it can be determined whether the abnormality is an abnormality due to the pressure of the fluid, or an abnormality in the flow rate adjusting device 100 itself, by referring to the information stored in the storage portion 90.

Further, in the flow rate adjusting device 100 according to this embodiment, when the control portion 30 controls the flow rate adjusting portion 20, the control portion 30 determines whether or not the pressure measured by the pressure sensor 70 is in the predetermined abnormal state, and notifies the abnormal state when it is determined that the pressure is in the predetermined abnormal state.

With this structure, the operator of the flow rate adjusting device 100 can easily recognize that the pressure measured by the pressure sensor 70 is in the predetermined abnormal state.

In this case, the predetermined abnormal state refers to one of the following states. That is, a state where the pressure measured by the pressure sensor 70 is maintained at the first predetermined pressure or lower, a state where the pressure measured by the pressure sensor 70 is maintained at the second predetermined pressure, which is higher than the first predetermined pressure, or higher, and a state where a variation per unit time of the pressure measured by the pressure sensor 70 exceeds the predetermined amount.

Further, the flow rate adjusting device 100 according to this embodiment includes the communication portion 95 connected via the external device 300 and the cable 200. When the communication portion 95 receives the transmission request for transmitting information from the external device 300, the control portion 30 controls the communication portion 95 to transmit the information stored in the storage portion 90 to the external device 300.

With this structure, it can be determined whether the occurring abnormality is an abnormality due to the pressure of the fluid, or an abnormality in the flow rate adjusting device 100 itself, by transmitting the information stored in the storage portion 90 in response to the transmission request from the external device 300 and referring to the information by the external device 300.

Further, in the flow rate adjusting device 100 according to this embodiment, when the communication portion 95 receives the deletion instruction from the external device 300 after transmitting the information to the external 300, the control portion 30 controls the storage portion 90 to delete the transmitted information stored in the storage portion 90.

With this structure, an area necessary for storing the information can be appropriately secured by deleting the information stored in the storage portion 90 after completion of the transmission of the information to the external device 300, while the information in the storage portion 90 can be reliably stored until the transmission of the information to the external device 300 is completed. Further, the deletion of the information stored in the storage portion prevents leakage of important classified information such as the control content of the control portion.

The invention claimed is:

1. A flow rate adjusting device comprising:
    an ultrasonic flow metering portion configured to measure a propagation time difference between ultrasonic waves transmitted by a pair of oscillators disposed at an upstream side and a downstream side of a straight tube-shaped measurement flow channel to obtain a flow rate of a fluid, the fluid flowing from an inflow port and being circulated through the measurement flow channel;
    a flow rate adjusting portion configured to adjust the flow rate of the fluid flowing out to an outflow port from the downstream side of the measurement flow channel;
    a control portion configured to control the flow rate adjusting portion in such a manner that the flow rate of the fluid measured by the ultrasonic flow metering portion matches a set value preliminarily set;
    a pressure measuring portion configured to measure a pressure of the fluid flowing into the upstream side of the measurement flow channel from the inflow port; and
    a storage portion configured to store information that associates the flow rate of the fluid obtained from the propagation time difference measured by the ultrasonic flow metering portion, the set value, and the pressure measured by the pressure measuring portion with each other when the control portion controls the flow rate adjusting portion.

2. The flow rate adjusting device according to claim 1, wherein
    the flow rate adjusting portion includes:
        a valve body portion inserted into a valve hole formed in an outflow-side flow channel portion configured to guide the fluid to the outflow port; and
        a drive portion configured to cause the valve body portion to advance or recede along a central axis of the valve hole, and
    when the control portion controls the flow rate adjusting portion, the storage portion stores information that associates the pressure measured by the pressure measuring portion and an opening degree of the valve body portion obtained from a position of the valve body portion caused to advance or recede by the drive portion with each other.

3. The flow rate adjusting device according to claim 2, wherein when the control portion controls the flow rate adjusting portion, the control portion determines whether or not the pressure measured by the pressure measuring portion is in a predetermined abnormal state, and notifies an operator of the flow rate adjusting device of the predetermined abnormal state when it is determined that the pressure is in the predetermined abnormal state.

4. The flow rate adjusting device according to claim 3, wherein the predetermined abnormal state is one of a state where the pressure measured by the pressure measuring portion is maintained at a first predetermined pressure or lower, a state where the pressure measured by the pressure measuring portion is maintained at a second predetermined pressure or higher, and a state where a variation per unit time of the pressure measured by the pressure measuring portion exceeds a predetermined amount.

5. The flow rate adjusting device according to claim 1, wherein when the control portion controls the flow rate adjusting portion, the control portion determines whether or not the pressure measured by the pressure measuring portion is in a predetermined abnormal state, and notifies an operator of the flow rate adjusting device of the predetermined abnormal state when it is determined that the pressure is in the predetermined abnormal state.

6. The flow rate adjusting device according to claim 5, wherein the predetermined abnormal state is one of a state where the pressure measured by the pressure measuring portion is maintained at a first predetermined pressure or lower, a state where the pressure measured by the pressure measuring portion is maintained at a second predetermined pressure or higher, and a state where a variation per unit time of the pressure measured by the pressure measuring portion exceeds a predetermined amount.

7. The flow rate adjusting device according to claim 1, further comprising:
    a communication portion to be connected to an external device via a communication line,
    wherein when the communication portion receives a transmission request for transmitting the information from the external device, the control portion controls the communication portion to transmit the information stored in the storage portion to the external device.

8. The flow rate adjusting device according to claim 7, wherein when the communication portion receives a deletion instruction from the external device after transmitting the information to the external device, the control portion controls the storage portion to delete the transmitted information stored in the storage portion.

* * * * *